United States Patent
Ruan

(10) Patent No.: US 7,995,263 B1
(45) Date of Patent: Aug. 9, 2011

(54) TRANSMISSION AND REFLECTION DUAL OPERATIONAL MODE LIGHT PROCESSING DEVICE

(76) Inventor: Ju-Ai Ruan, Plano, TX (US)

( * ) Notice: Subject to any disclaimer, the term of this patent is extended or adjusted under 35 U.S.C. 154(b) by 209 days.

(21) Appl. No.: 12/317,603

(22) Filed: Dec. 26, 2008

Related U.S. Application Data

(60) Provisional application No. 61/011,376, filed on Jan. 17, 2008.

(51) Int. Cl.
*G02B 26/00* (2006.01)

(52) U.S. Cl. .................................. 359/290; 359/237

(58) Field of Classification Search .............. 359/237, 359/238, 245, 246, 259, 290–295, 298, 315, 359/316, 318, 618; 362/297, 330, 626; 372/43, 372/45, 46.01; 355/67, 71

See application file for complete search history.

(56) References Cited

U.S. PATENT DOCUMENTS

| | | | | |
|---|---|---|---|---|
| 5,897,184 | A * | 4/1999 | Eichenlaub et al. | 349/64 |
| 6,084,657 | A * | 7/2000 | Masuda et al. | 355/71 |
| 6,803,560 | B1 * | 10/2004 | Okumura et al. | 250/231.16 |
| 6,865,205 | B2 * | 3/2005 | Kito | 372/46.01 |
| 7,400,439 | B2 * | 7/2008 | Holman | 359/298 |
| 7,508,046 | B2 * | 3/2009 | Nagai et al. | 257/459 |

* cited by examiner

*Primary Examiner* — Loha Ben

(57) ABSTRACT

A spatial light modulator suitable for flat panel displays and methods of making the modulators are disclosed. The light modulator comprises a light separator, integrated circuits (IC), light switches (concurrently called light shutters), and optional color filters. The light separator is used to direct light uniformly illuminated on the incident surface (entrance surface) into individual pixels, and condenses the light within each pixel to a small fraction of pixel space on the viewing surface. ICs and light shutters are used to control color and light intensity at individual pixels. Several novel designs of the light modulator and light shutters are disclosed. Methods of building self-aligned structures for placing micro-spherical ball spacers for attaching protective screens to the light modulator is also disclosed.

15 Claims, 18 Drawing Sheets

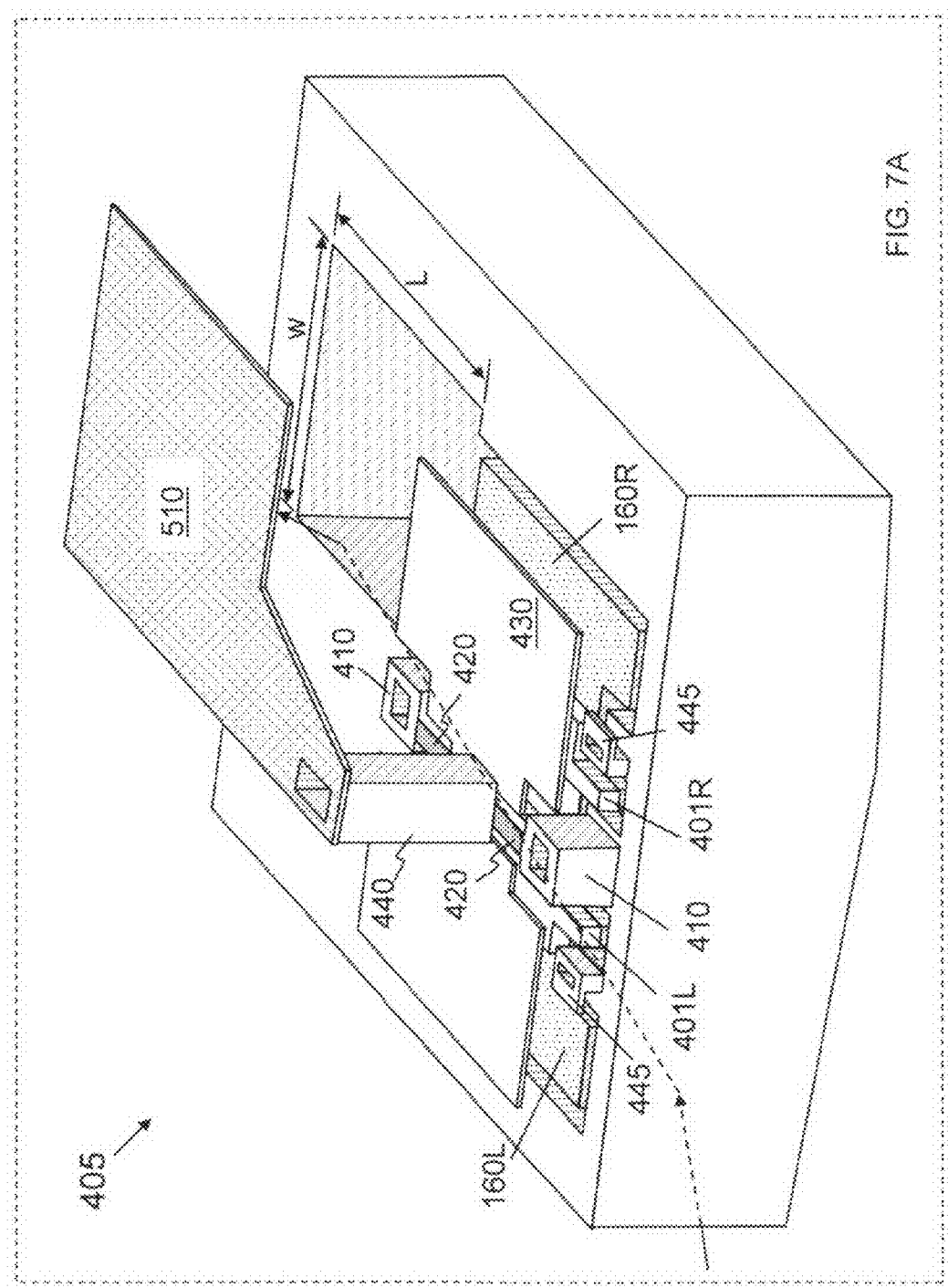

TRANSMISSION AND REFLECTION DUAL OPERATIONAL MODE LIGHT PROCESSING DEVICE

RELATED APPLICATIONS

This application claims priority to U.S. Provisional Application No. 61/011,376, filed Jan. 17, 2008. The content of the aforementioned application is hereby incorporated by reference in its entirety.

TECHNICAL FIELD OF THE INVENTION

This invention is generally directed to spatial light modulators, more particularly but not limited, to flat panel display devices and fabrication thereof.

BACKGROUND OF THE INVENTION

Liquid crystal display (LCD) and plasma display (PD) are rapidly replacing cathode-ray-tube (CRT) display due to their substantially reduced panel depth compared to CRT. However, both LCD and PD are relatively inefficient in energy use and inflexible in their physical structure. For example, LCD uses polarizer that reduces light intensity by fifty percent, while PD consumes significantly more power per lumen than LCD. There exist a number of disclosures and publications on using micro-electro-mechanical (MEM) devices for display applications. Some MEM based displays, such as DLP from Texas Instruments, is useful for projection systems but difficult to be applied to flat panel displays. Various other proposed MEM devices have their own difficulties, including performance, manufacturability, and reliability issues that prevent them from becoming commercial use. Needs exist for flat panel displays and portable displays having both performance (e.g., high energy efficiency, high contrast ratio, physically flexible for improved portability) and low cost advantages.

SUMMARY OF THE INVENTION

The needs are met according to the present invention by providing a method of making a new type of spatial light modulating device particularly useful for flat panel light displays. The following sections present a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

Aspects of the present invention facilitate the efficient utilization of light in image display devices. One aspect of the invention includes forming a light separator, which directs light uniformly illuminated on a surface (generally the backside or entrance surface of a display panel, the first surface) into individual pixels on the viewing surface (generally called the front side surface, the second surface), and to condense the light within each pixel to exit only through small exit grooves, so that light spreads over only a small fraction of the pixel space. A large portion of the viewing surface is thus free for building or placing light switching structures and integrated circuits (ICs). The ICs are used to control the position of the light switches (concurrently called light shutters) which in turn to control the final path of light in each pixel, either to let the light pass through to viewer or to block it off.

Another embodiment of the invention is forming micro-electro-mechanical (MEM) light switches (shutters) to control the final path of light in each pixel, either let light to pass through to viewer or block it off from reaching to viewer, depending on the position of the shutters. The function of the light shutter is similar to that of liquid crystal in LCD. But unlike LCD, polarizer, a material that reduces the passage of ordinary un-polarized light (usually reduces by fifty percent) is eliminated from the new device. And unlike plasma display (PD), this device allows the use of efficient external light sources instead of internal plasma discharge inside each pixel, which is generally less energy efficient. Thus power consumption of the new display device is reduced compared to both LCD and PD for similar display outputs (similar panel size and brightness).

Another embodiment of the invention is forming light shutters with specific characteristics: that they are easy to address electrically (to be able to turn ON and OFF using relatively low voltages); that they are effective in blocking light when turned OFF and in passing the light through to viewer when turned ON; and that they have small moment of inertia with fast response speed. These characteristics are obtained by building dual layer shutters. The primary function of the first layer of the dual layer shutters is to provide effective electrostatic interaction with addressing electrodes, so that low voltage addressing of the shutter (rotate the shutters to their specific landing positions) is possible. This layer of shutter is placed sufficiently close to the addressing electrodes and is free to rotate in both directions around its axis of rotation (hinge) within certain range of angles. This layer of shutter generally lands on one of its two stable positions: ON or OFF position. Hinges are attached to light separator through hinge posts (also called via). The second shutter layer is to provide light switching action. As such, its position is in alignment with the light exiting grooves, i.e., it is placed directly above the light exiting grooves in the light separator. It covers the space above the light exit grooves but not everywhere else. This reduces the total mass of the shutter. In addition, the second shutter layer is formed such that its center of mass is close to its hinges so that the moment of inertia of the entire shutter is minimized. In some applications, a second auxiliary shutter within each pixel comprising only the first shutter layer is used. This auxiliary shutter provides some added light switching ability to the second shutter layer (top shutter layer) of the first shutter, allowing the first shutter to be made slightly smaller than would be needed if the auxiliary shutter is not used.

According to another aspect of the invention, a method of making view angle adjusters on top of the light separator is provided. The view angle adjusters are used to control the amount of light reflected by the second shutter layer in each pixel into different angles, and are built using the same process steps the shutters are made, with no extra manufacturing process steps/costs.

Another embodiment of the invention is forming integrated circuits (ICs) on top of the light separator, either as an integral part of the light separator, or on a separate part attached to and above the light separator. The ICs are used to drive the micro-electro-mechanical light shutters to control the final path of light at individual pixel (or display light intensity at each pixel) for image display.

According to another aspect of the invention, methods of forming color filters for the new light modulator are provided. The color filters are formed either on top of the light separator, within the light separator, or on a separate component within a display panel, above or below light shutter, or anywhere suitable to control the color of individual pixels.

According to another aspect of the invention, micro-spherical balls are used as spacers for attaching a protective screen (display screen) to the light modulator to cover and protect the MEM structure (light shutters). The micro-spherical balls are placed to the light modulator through self-aligned structures built in the light modulator. The protective screen is made in black color in all area except where light exits from (light exit grooves for each pixel) to substantially increase the contrast ratio of the new display device. In special cases where the new device is operated in reflective mode, the protective screen has additional light entrance windows for each pixel to let ambient light to enter into the modulator.

BRIEF DESCRIPTION OF THE DRAWINGS

FIG. 7A is a 3-D view of an improved light shutter on top of a light separator in accordance of the present invention.

DETAILED DESCRIPTION

Figure 1A:
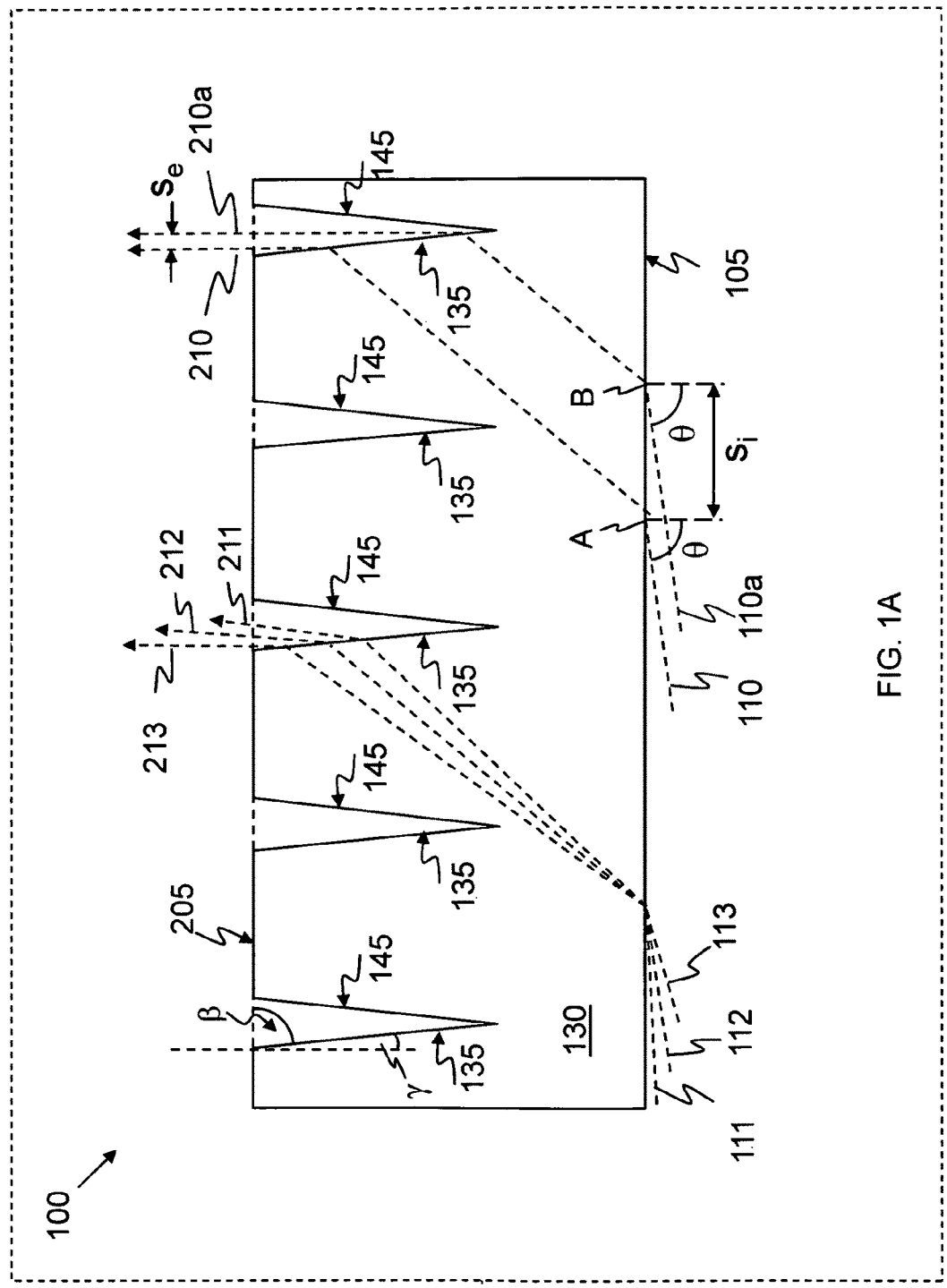
FIG. 1A is a cross-section view of a light separator 100 in accordance with a first embodiment of the present invention, with light incident at glazing angles on a flat first surface 105 of transparent medium 130 with sloped exit grooves.

A new type of display device is created according to the present invention. This new display device is expected to be much more energy efficient than existing ones such as LCD and PD. The new device can also be created using transparent plastic materials as the primary building material for its display panel, making it much more flexible than LCD and PD.

One aspect of the invention is to use micro-electro-mechanical shutters to control the path of light in a display device, such as but not limited to, backside illuminated flat panel display device. Light under the shutters is let pass through to viewer without much loss when shutters open up the paths (turned "ON") for light to go through, or is blocked off completely when shutters cut off the paths of the light (turned "OFF") to prevent the light from reaching to viewers.

It is obvious that the micro-electro-mechanical shutters occupy a large portion of planar space of a display panel. This would ordinarily block off the path of a major portion of light all the time when light is uniformly distributed over the surface where the shutters are built or placed. Another aspect of the invention is to make a light separator that directs light uniformly illuminated on the backside (first surface) of a display panel into individual pixels, and condenses the light in each pixel so that it spreads over only a fraction of the pixel space when exits at the viewing surface (second surface), leaving the rest of the pixel space (which will be a large portion of pixel space) free for building or placing micro-electro-mechanical shutters.

One embodiment of the invention in making such a light separator is to first divide the planar surface of a transparent medium in which light passes through into a matrix of pixels, and to make a groove structure of certain depth on the exit side for each pixel. Light is directed into the transparent medium from incident surface (first surface) and onto the groove surface at angles (with respect to the normal of groove surface) slightly smaller than the angle that would otherwise cause total internal light reflection at the groove surface. Therefore, upon encountering the grooves, the light will exit the grooves at a large exit angle (also with respect to the normal of groove surface). When groove surface is made to have angles equal to 90 degrees, or slightly less than but close to 90 degrees with respect to the viewing surface (second surface) of the light separator, the light will exit nearly perpendicularly to the view surface of the light separator. Under certain conditions (light incident angle, groove width and depth, and groove surface angle, to be described in more details later), light can only exit from the grooves. In other words, light is "squeezed" or "condensed" to only exit from the grooves. The spread of light over the view surface is limited by the width of the grooves.

There are at least several designs using this concept to make the light separators. In what follows, a few specific designs are described, in part as embodiments of this invention, and also in part to more clearly describe the basic concept of light separator which is another embodiments of the present invention covering these examples. These examples are not intended to identify the scope of the basic concept of light separators. It should be understood that this invention is not limited to the specific embodiment examples, which will be described subsequently.

One embodiment of this invention of making a light separator 100 is shown in FIG. 1A, in combination with the use of incident light having large incident angles θ (glazing angle incidence, where θ is the angle between incident light and the normal of incident surface 105). Light enters transparent medium 130 from air (refractive index=1). The medium is made of common materials such as optical glass (refractive index ~1.46 or higher) or optical quality plastics. Non-vertical (sloped) grooves are made on the light exit side of light separator. Each groove has two surfaces: groove exit surface 135 and back surface 145. Light exits the grooves from groove exit surface 135, which is at an angle β with respect to viewing surface 205. Angle β is defined as groove exit surface angle. For easy description, groove exit surface tilt angle γ is introduced, which is the complementary angle of angle β. Groove exit surface tilt angle γ is a measure of angular deviation of groove exit surface from the normal of viewing surface 205. For vertical grooves (to be described subsequently), angle β equals to 90 degrees and groove exit surface tilt angle γ equals to zero degree. The groove exit surface tilt angle is made just large enough to avoid total internal light reflection at groove exit surface 135 for light entering the medium with a large incident angle, for example, light 110 and 110a entering the medium at angle θ. When light encounters a groove exit surface 135, the light will pass through the surface but only barely avoid total internal reflection at the surface. Under certain range of incident angles θ and groove exit surface angles β, and combination thereof, all of which can be determined based on the basics of geometric optics and the refractive index of the medium, the exit light (210) will be at a relatively small angle with respect to the normal direction of viewing surface 205.

If low refractive index materials is used for the medium (e.g., n<1.414), or the space outside of the transparent medium is filled with low refractive index materials (e.g., n=1.07 or up, assuming the refractive index of the medium is 1.46), the grooves can be made of vertical shape (as in FIG. 1B, or γ=0) and light with sufficiently large incident angles θ can also exit from the grooves without experiencing total internal reflection at the groove exit surface 135.

An important aspect of this embodiment is that, while light is uniformly incident onto the entrance surface (first surface), exit light is confined to only exit from the grooves. Still referring to FIG. 1A, when two parallel light beams, 110 and 110a enter the medium at points A and B, their separation at the entrance surface 105 is $s_i$. Upon exiting from the grooves, the separation of the corresponding two exit beams (210 and 210a) on viewing surface (second surface) 205 becomes $s_e$. The spatial separation $s_e$ of light beams on viewing surface is much smaller than the spatial separation $s_i$ of the corresponding light beams on the incident surface. In other words, light is "condensed" to exit only from the grooves. This yields a large portion of free space on exit surface outside of the grooves for building or placing integrated circuits (ICs) and micro-electro-mechanical shutters (to be described later) to control the final path of the exit light.

For a fixed groove exit surface angle β when incident light has a small range of incident angles θ, exit light will also have a range of angles, as shown in FIG. 1A, where light beams 211, 212, and 213 exiting from a groove correspond to incident light beams 111, 112, and 113, respectively. Note that drawing of this figure is only schematic, not necessarily proportional to actual angles.

Figure 1B:
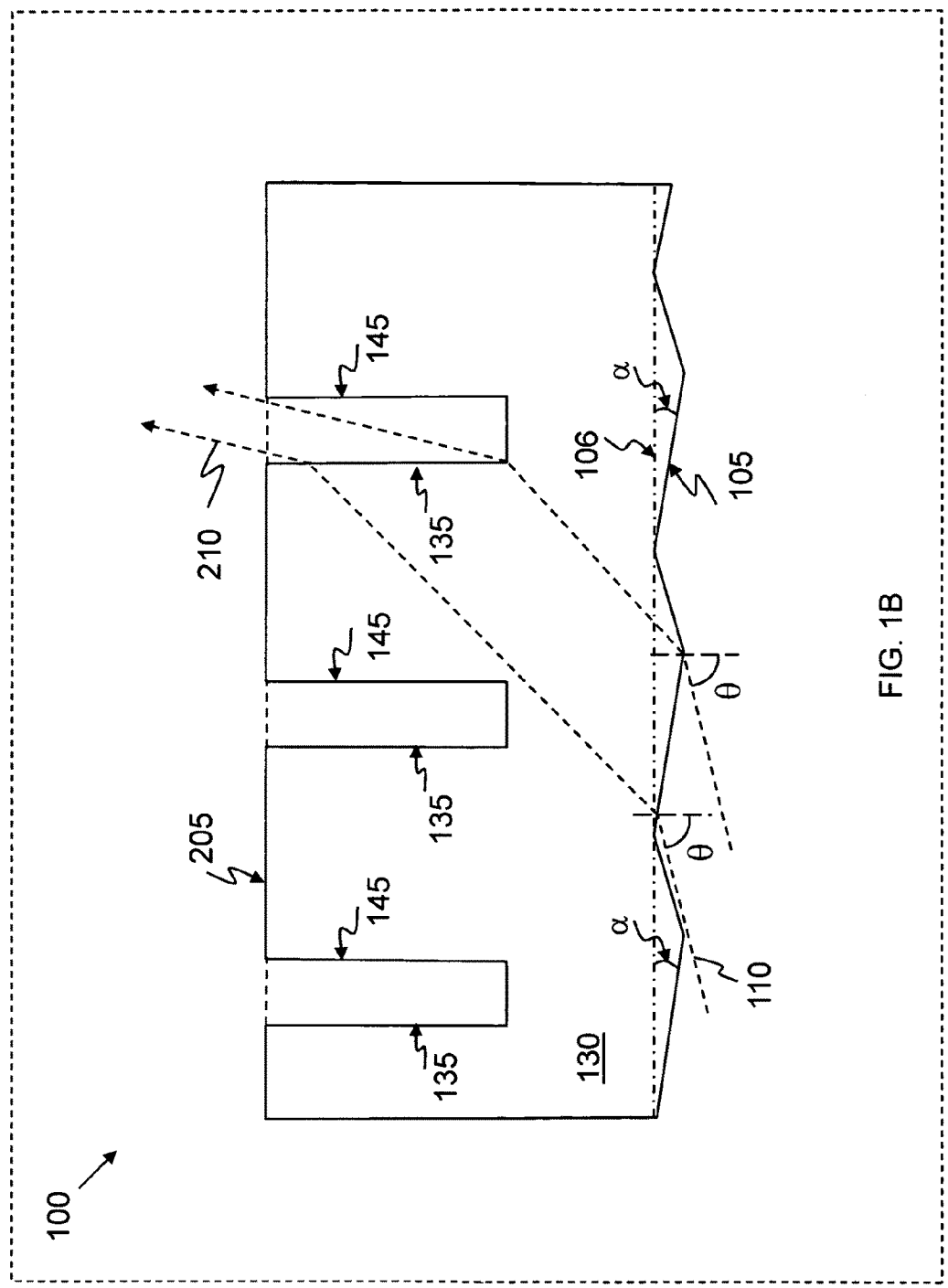
FIG. 1B is a cross-section view of another light separator 100 in accordance with a first embodiment of the present invention, with light incident at glazing angles on a saw-tooth shaped first surface 105 of transparent medium 130 with vertical exit grooves.

Another embodiment of this invention of making light separators is shown in FIG. 1B, where the incident surface is made saw-tooth shaped while allowing the groove exit surface 135 to be perpendicular or nearly perpendicular to the viewing surface (β~90 and γ~0, all in degrees). First, refer to FIG. 1B, the angle between the incident surface 105 (the surface that faces the incident light) of the saw-tooth shaped light separator and the imaginary flat surface 106 was the saw-tooth structure not present, is defined as front edge saw-tooth angle α. Under certain range of incident angles and the front edge saw-tooth angles α, light 110 entering medium 130 will exit from the grooves without experiencing total internal reflection at the groove exit surface 135. Furthermore, under certain range of incident angles θ and front edge saw-tooth angles α, and combination thereof, exit light 210 is also spatially condensed to only exit from the grooves at small angles with respect to the normal direction of viewing surface (205), FIG. 1B.

Figure 1C:
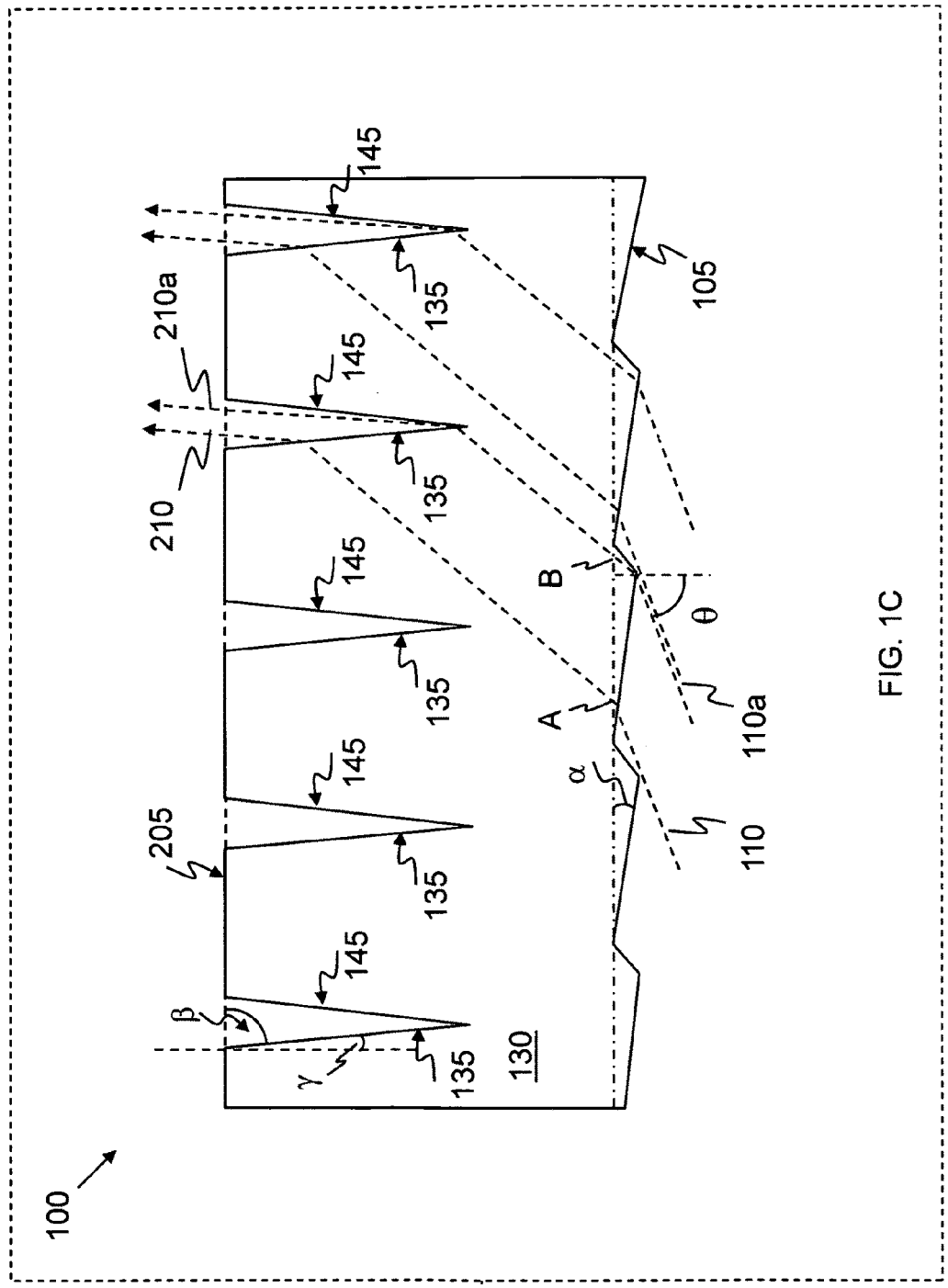
FIG. 1C is a cross-section view of another light separator 100 in accordance with a first embodiment of the present invention, with light incident at glazing angles on a saw-tooth shaped first surface 105 of transparent medium 130 with sloped exit grooves.

Embodiment of this invention shown in FIG. 1A and FIG. 1B can each be employed individually or in combination of each other, as shown in FIG. 1C, where saw-tooth shaped incident surface is combined with sloped exit grooves to form a light separator. In practice, for a design which intends to use the method described in FIG. 1B, FIG. 1C may be more closely representing reality as there is generally some process variation that can make an intended vertical groove not perfectly vertical (or sloped).

While there is certain requirement on the groove exit surface angle β, depending on if the incident surface is flat or saw-tooth shaped, the angle of groove back surface 145 with respective to viewing surface is relatively less restrictive providing that the grooves do not widen up too much on the top to take significant amount of pixel space. Furthermore, groove back surface does not need to be transparent. It can be made reflective, or absorptive, or transparent, depending on specific design of light separator (groove width and depth, pixel width) and application. One example would be to make the groove back surface reflective and at about 75 degrees with respect to the viewing surface. So that light exits from groove exit surface at angles larger than 15 degrees with respect to the normal of viewing surface may be reflected by the groove back surface and re-directed to slightly different direction when exits from viewing surface. This allows the groove width to be made narrower than would be needed without losing the light.

Figure 1D:
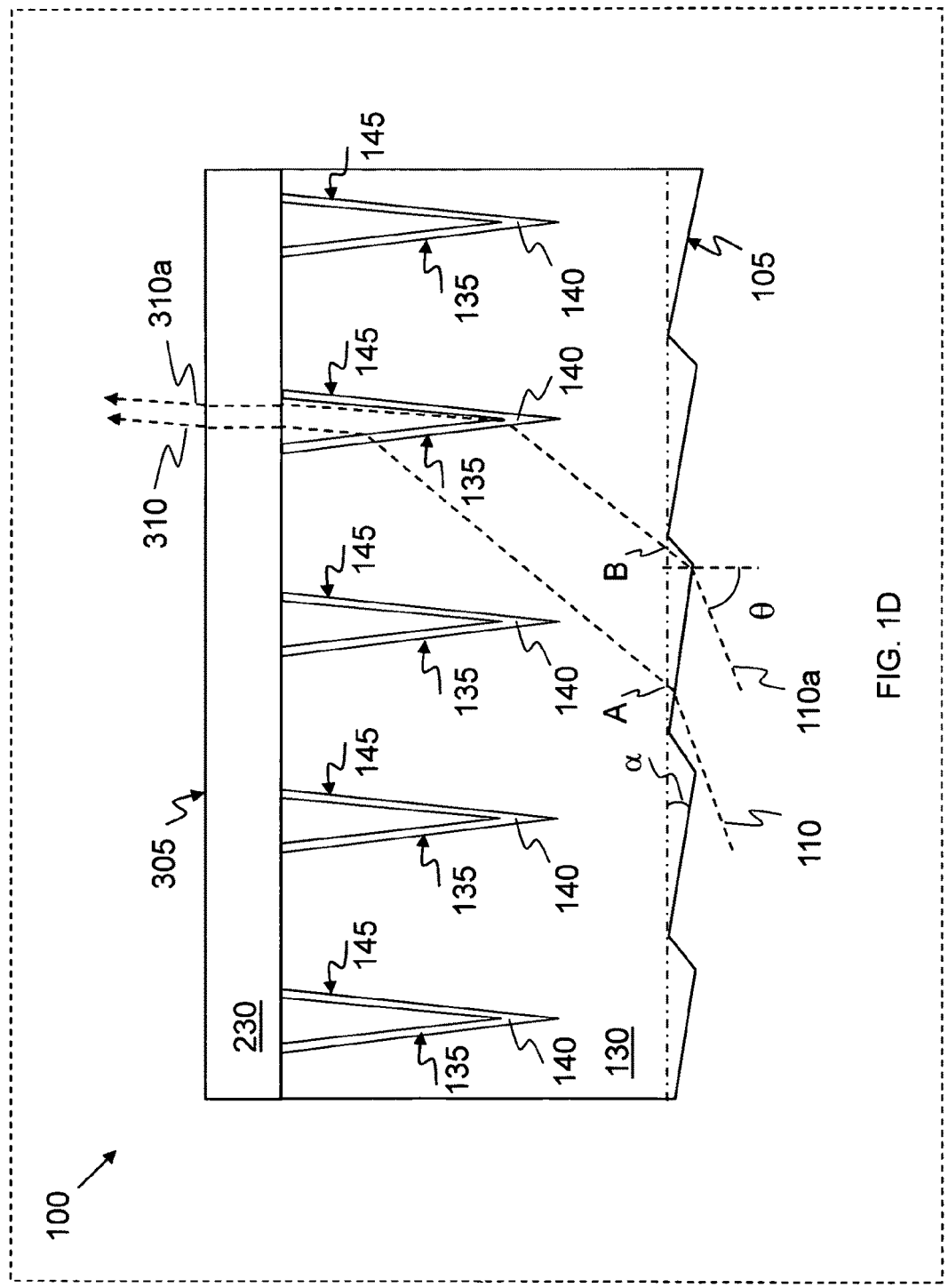
FIG. 1D is a cross-section view of another light separator 100 with color filters 140 coated on the exit grooves, with saw-tooth shaped first surface 105 and sloped exit grooves, and with a parallel plate 230 placed on top of transparent medium 130.

Once light 210 is directed and condensed to exit from grooves, placing a thin transparent parallel plate on top of the grooves will not change the final exit angle of the light, nor will this change the spatial spread of exit light substantially. This is shown in FIG. 1D, where a parallel plate 230 is placed on top of the grooves. The angle and the spatial spread between light beams 310 and 310a exiting from the new exit surface 305 (top surface of the parallel plate) are the same as those of the corresponding light beams 210 and 210a on exit surface 205 in FIG. 1C, where the parallel plate is not used.

The condensed nature of light will not be affected by the transparent parallel plate placed above the grooves. This gives one the freedom to build micro-electro-mechanical shutters either directly on top of medium 130 on surface 205 adjacent to the grooves (FIGS. 1A-1C), or on surface 305 of a parallel plate 230 placed on top of the grooves (FIG. 1D). For this reason, when used, the parallel plate is considered part of the light separator. There may be some manufacturing advantages using a parallel plate. For example, color filters (if used for color display) can be coated onto the plate relatively easily. Similarly, a transparent parallel plate sandwiched inside medium 130, between exit surface (below all grooves) and incident surface, will also not change the final exit angle or spatial spread of exit light. Doing so may also add some flexibility in the manufacturing process of light separator.

Not only a transparent parallel plate placed on top of the grooves will not change the final exit angle or the spatial spread of the light, a layer of transparent thin film uniformly coated on the surface of grooves also will not change these parameters. This is also illustrated in FIG. 1D, where a layer of transparent thin film optical material 140 is coated on the grooves. The angle of light exiting from the grooves will not be significantly affected by the coating of an optical material of uniform thickness. In the absence of this material, when light encounters the groove surface at an angle close to but slightly smaller than the critical angle between the medium and air, the light will exit from the groove at small angles with respect to the normal of viewing surface 305. This behavior will not be significantly affected by the use of the optical material coated on the grooves surface, provided that the thickness of the material is uniform across the grooves. This neutral effect of the thin film coated on groove surface on light exit angle is useful. For example, 140 can be a layer of color filtering material. Different pixels (or sub-pixels) can be coated with different color filters for color display. More details on color filter will be discussed at later sections. This thin film material can also be some etch stop material to protect the grooves during subsequent ICs and MEM manufacturing processes, allowing the use of a wide selection of materials for transparent medium 130. For example, transparent medium 130 can be made of plastic. During later process in making the ICs and MEM shutters, the grooves may be filled with photo resist which will need to be removed in the final process steps. It is essential that the grooves are not damaged during final resist removal. This can be achieved by having a thin film materials such as SiN, SiO2, or SiC coated on the grooves as a mask for photo resist removal.

Figure 2:
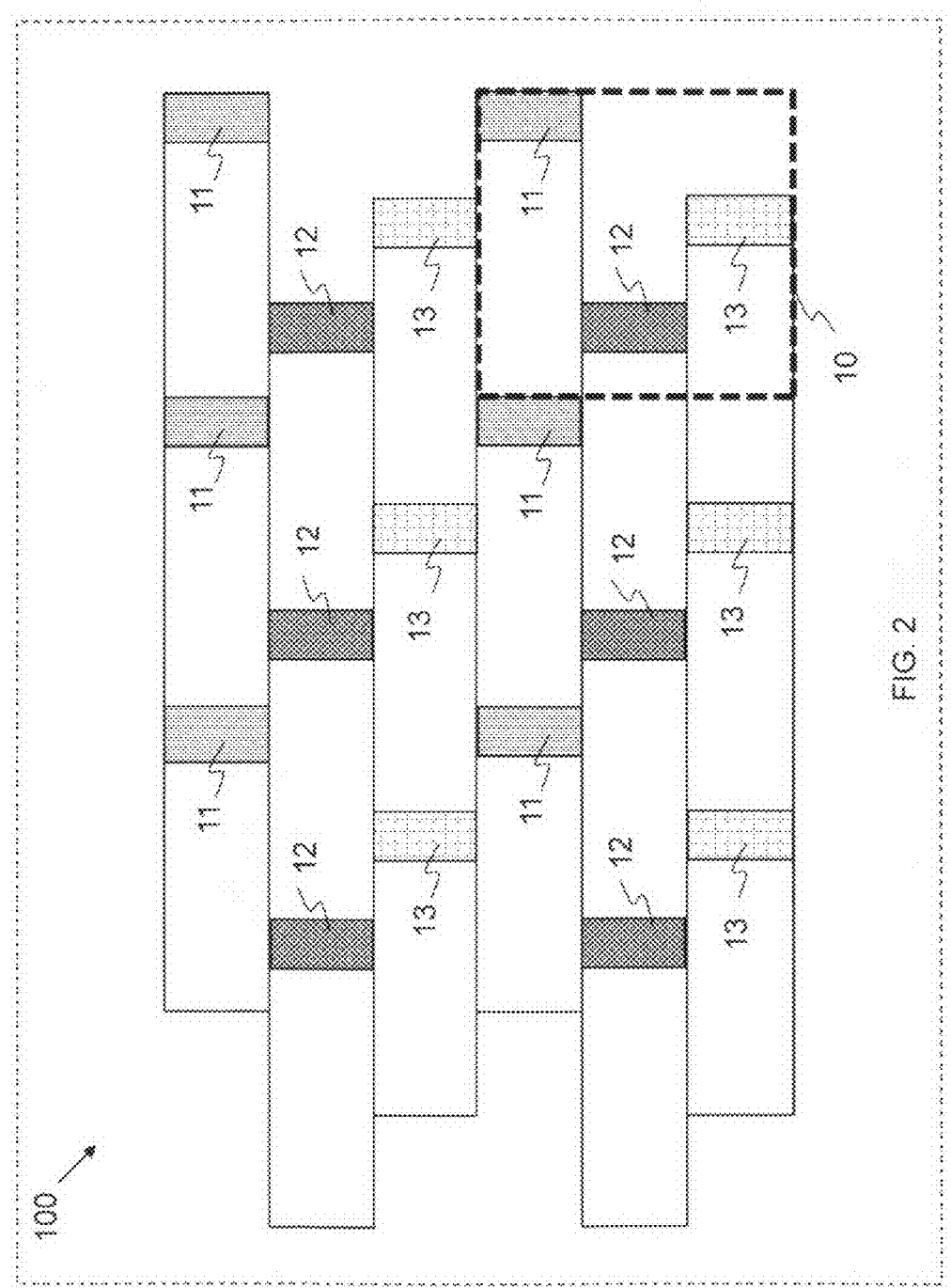
FIG. 2 is a schematic top view of a 3×2 array of pixels in a light separator, each having 3 sub-pixels for three different colors, in accordance of the present invention.

An array of fore mentioned structure formed in medium 130, either sloped grooves combined with flat incident surface, or vertical grooves combined with saw-tooth shaped incident surface, or sloped grooves combined with saw-tooth shaped incident surface, would therefore direct light uniformly illuminated over the incident surface (first surface) into an array of grooves, FIG. 2 (top view). In this top view drawing, the square box 10 enclosed by heavy dotted lines at the bottom right represents a pixel. Each pixel consists of three sub-pixels, with their exit grooves denoted by three different shaded areas 11, 21 and 31. These sub-pixels are for displaying three colors (e.g., red, blue and green) if using white light source, but can also simply be three smaller pixels of a large pixel in sequential color display (in which different color of light is displayed at different time). Light enters the medium from first surface beneath, traveling from left to right, and exits from the viewing surface (second surface). Light in the region indicated by the rectangular boxes to the left side of each exit grooves will be condensed to exit from the corresponding grooves. It is noted that this figure is for illustrating the basic principle. Many variations can be made. For example, in sequential color display, each pixel may contain only one sub-pixel (itself), or different number of sub-pixels other than 3. If using white light source, each pixel may consist of more than 3 sub-pixels, and display more than 3 colors.

As previously described, the fore mentioned specific embodiments of making light separators of the present invention illustrate only some example structures of light separators. The fundamental principal in these examples is to direct light uniformly illuminated on the backside of a display panel into individual pixels, and to condense the light within each pixel into small area (exit grooves). In these examples, light is introduced to light separator such that, when encountering exit grooves, the light is at angles with respect to the normal of groove exit surface slightly smaller than the angle that would otherwise cause total internal light reflection at the surface. Thus the light exits the surface and is at a large exit angle with respect to the normal of groove exit surface 135, or at small angle with respect to the normal of viewing surface 205. This not only condenses light illuminated over a large incident surface area into a small exit area, but also confines the angular spread of exit light to within a small range. As a result, it becomes possible to build micro-electro-mechanical (MEM) structures adjacent to the grooves without permanently blocking the light that would otherwise come into that area, and to use the MEM structures to control the final path of light that is illuminated over a large pixel area but now only exits from the small grooves. The shutters either let light exit or block off the path of light. With this understanding, it should be understood that this invention is not limited to the specific embodiment examples described above.

Figure 3:
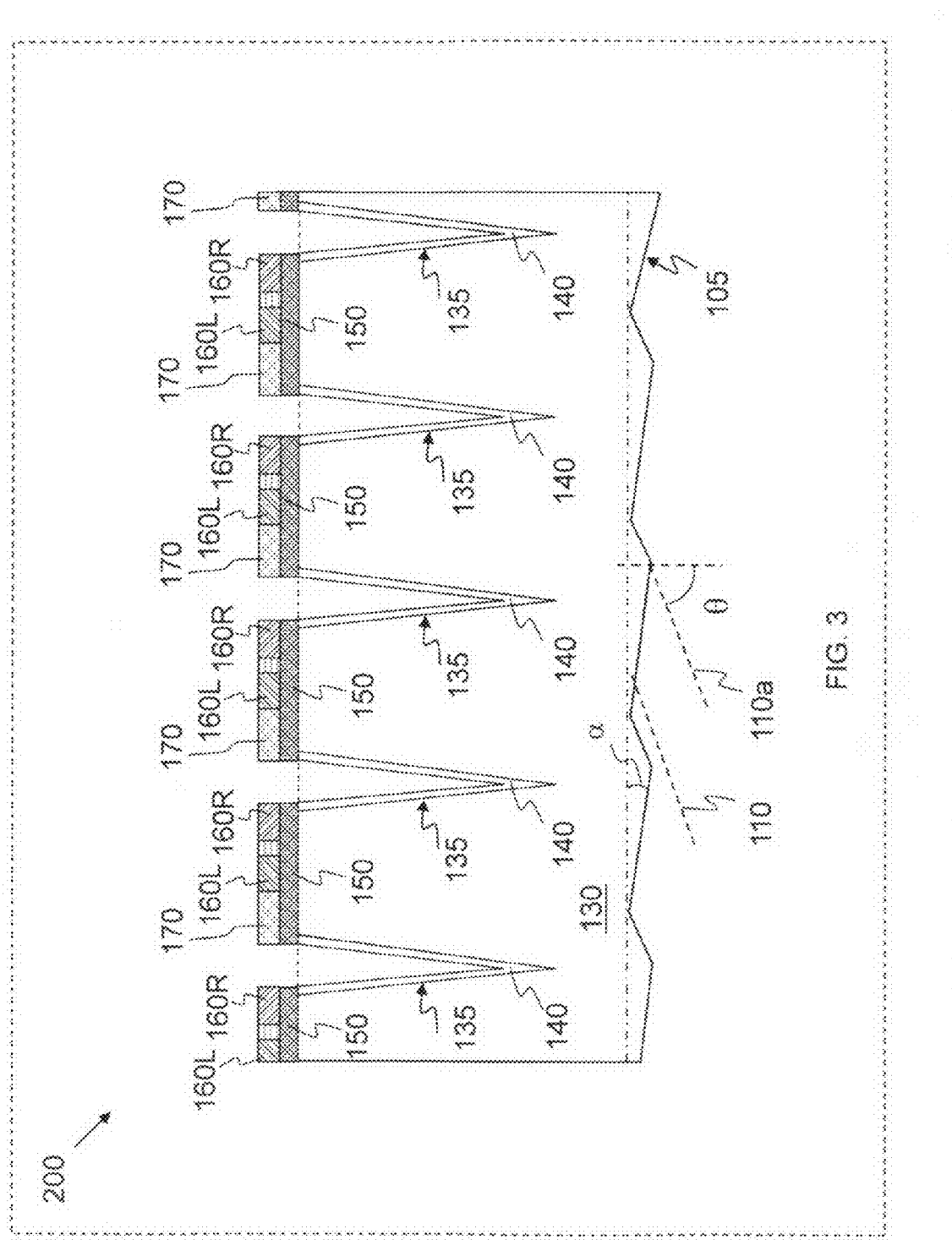
FIG. 3 is a cross-section view of a light separator with ICs 150 (include addressing electrodes 160L and 160R) formed on top in accordance of present invention.

Having the light separators 200, transistors and capacitors (collectively called integrated circuits, or ICs 150) can be formed on top of the light separator, in area adjacent to but away from the grooves, in FIG. 3. The ICs can be of TFT (thin film transistor) type similar to those used for LCD. In this figure, it is assumed that a layer of color filtering material or transparent etch stop material 140 is coated on the groove surface, but no parallel plate is placed on top of the grooves. In a more general term, ICs are made on top of the light separator away from the path of light, since as mentioned previously a transparent parallel plate can be placed on top of the grooves as shown in FIG. 1D. The ICs can be made more easily with and on top of a parallel plate than without, and color filters can more easily be coated on the parallel plate than on the grooves. However, for brevity, in the following discussion, it is assumed that ICs and all structures after the ICs are built on top of light separator without a transparent parallel plate placed on top. But all discussion applies to cases where parallel plates are used, including cases using modified parallel plate, e.g., a parallel plate coated with different color filters in different pixels or sub-pixels.

Unlike LCD, where optical transparency is a necessity in most pixel area, this invention allows the use of opaque material on top of light separator in most area except above light exit grooves. ICs schematically shown in FIG. 3 and several subsequent figures (FIGS. 4, 5, 8B and 10) are represented by a shaded area 150, which, for brevity of illustration, covers the entire surface area of light separator except the grooves. In practice, the actual space needed to build the ICs may only be a very small fraction of that area, especially for large screen displays. Thus the ICs may be arranged in location anywhere away from the light exit grooves, not necessarily taking up the entire space as shown in the figures. On the other hand, the availability of large space for building the ICs means that the line structure for the ICs can be made large, making it much easier to build the ICs than building the ICs in other displays such as LCD. In this drawing, electrodes 160L and 160R used for carrying electric signal to address light shutters (to be described subsequently) are placed above the ICs and can be considered as part of the ICs.

A number of variations can be applied above and below the ICs for tailored electro-optical performance. For example, above the light separator but before ICs are made, a layer of reflective material can be applied to facilitate recycling the light that has not been directed to viewer (that has been blocked off by shutters). In most cases such light recycling may not be important. Increased contrast ratio may be preferred instead. In such cases the same region can be coated with highly absorptive materials to reduce the possibility of stray light going out to viewer. The use of materials to modulate the surface reflectivity in that region is thus optional and depends on specific applications. In many cases this material can easily be incorporated onto the light separator in the ICs manufacturing process. Therefore no such material is separately specifically depicted in any of the drawings. The IC manufacturing uses substantially the same processes that are widely used in the IC industry and by LCD manufactures. Those details will not be described in detail in this invention.

Similarly, after ICs are made, a layer of highly absorptive material (or anti-reflective material) can be applied above the ICs in most areas (such as on top of addressing electrodes, 160L and 160R, in FIG. 3 and several subsequent figures) to absorb any stray light in the space above to further improve optical contrast. The use of this material is optional, and if needed, it is also generally obvious. Thus this will also not be described in further details in this disclosure. In certain configurations, there is a small region 170 above the IC 150, in FIG. 3 (and in several subsequent figures), where high reflectivity may be preferred. This will be more clearly illustrated in subsequent sections.

It is further noted that, although not preferred in practice, the ICs can also be placed elsewhere other than directly on top of light separator as shown in FIG. 3 and subsequent figures. For example, ICs can be built on a display screen, in which case the electrodes under the light shutters will need to be connected to the ICs through some type of connectors (which may be built while light shutters are made—to be described subsequently). This is not necessary a convenient manufacturing process but nevertheless will not affect the overall device function. The exact location of the ICs does not affect the application of the embodiments of this invention.

Another embodiment of the invention is forming micro-electro-mechanical (MEM) light shutters on top of light separator. Many MEM shutters of different designs can be used for the application. An obvious example would be shutters that displace laterally with respect to the viewing surface. These shutters are brought to their OFF position to cover the grooves and block off light, and to their ON position to displace away from the grooves to allow light to pass through. Another type of shutters, torsional shutters, that rotates around their hinges can also be used. This type of shutters has been widely used in projection display devices, namely, in Texas Instruments' DLP. Therefore this type of shutter will be used as examples to illustrate the functional principle of the new type of light modulator, along with several specific embodiments to improve the design of the shutters. It should also be understood that this invention is not limited to the specific embodiment examples that follow.

Figure 4:
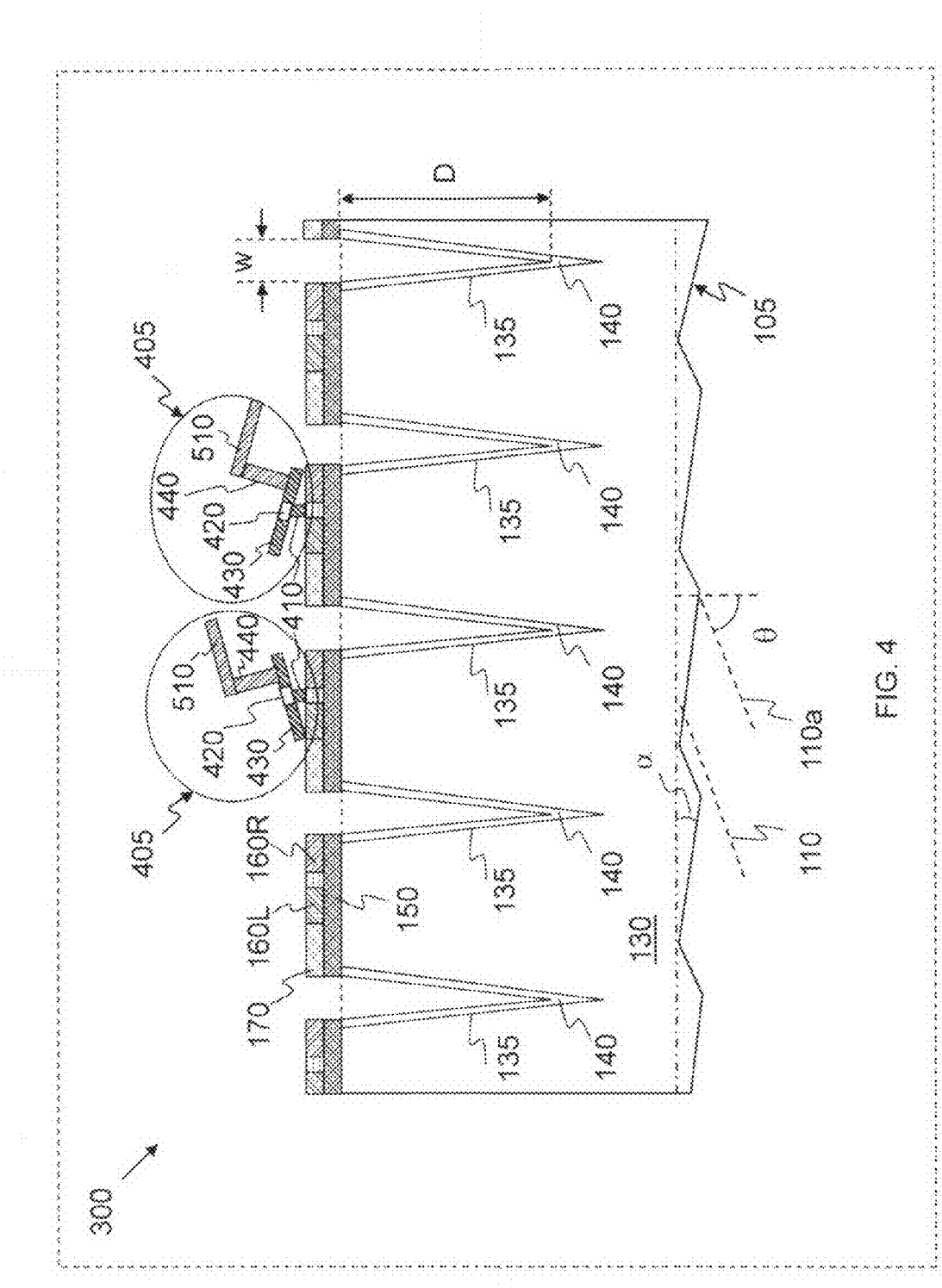
FIG. 4 is a simplified cross-section view of a light modulator comprising a light separator with color filters, ICs, and MEM light shutters in accordance of present invention.
Figure 5:
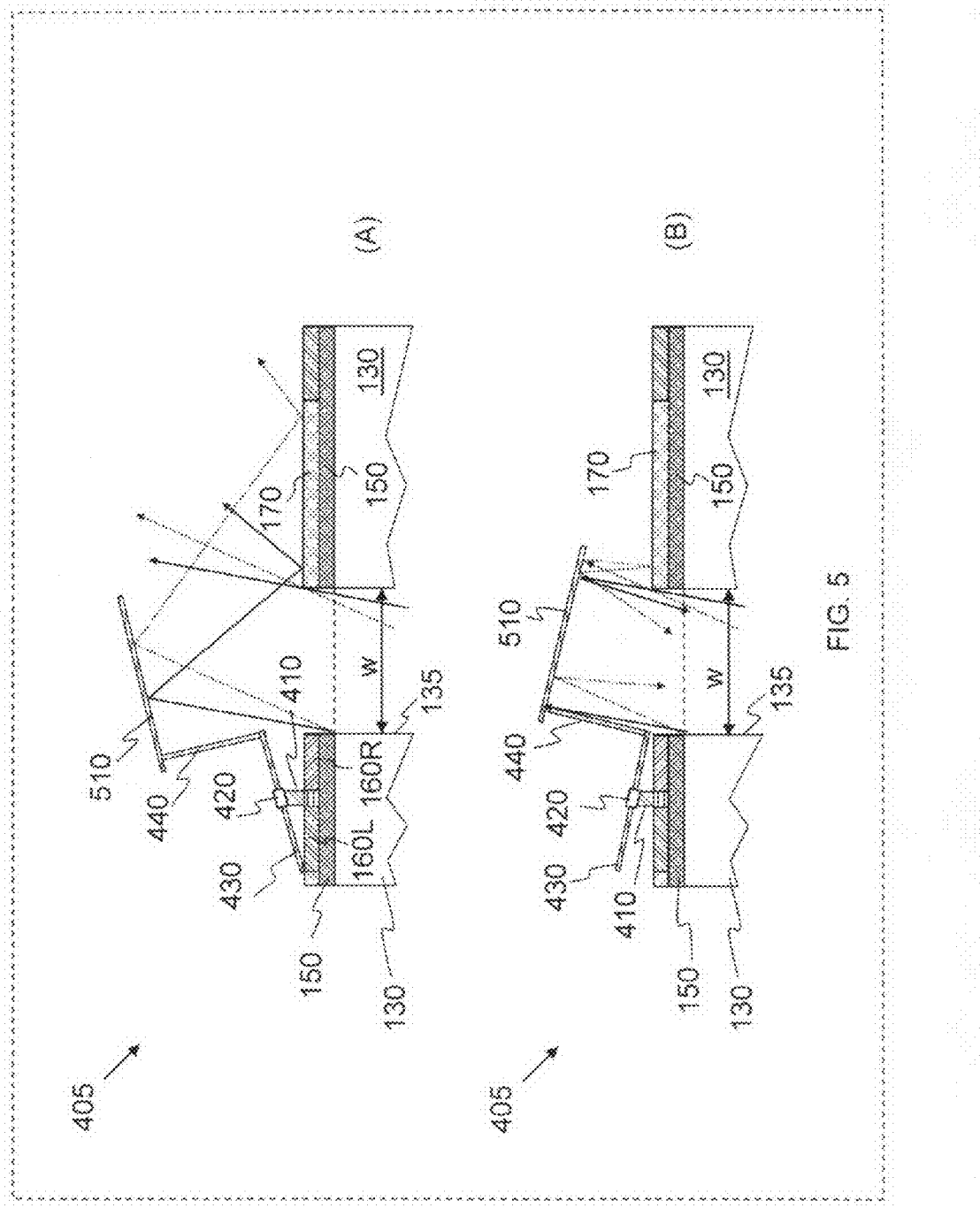
FIG. 5A is a simplified cross-section view of a section of light modulator with a light shutter in its ON state, illustrating light switching function of the light modulator in accordance of present invention.
FIG. 5B is a simplified cross-section view of a section of light modulator with a light shutter in its OFF state, illustrating light switching function of the light modulator in accordance of present invention.
Figure 6:
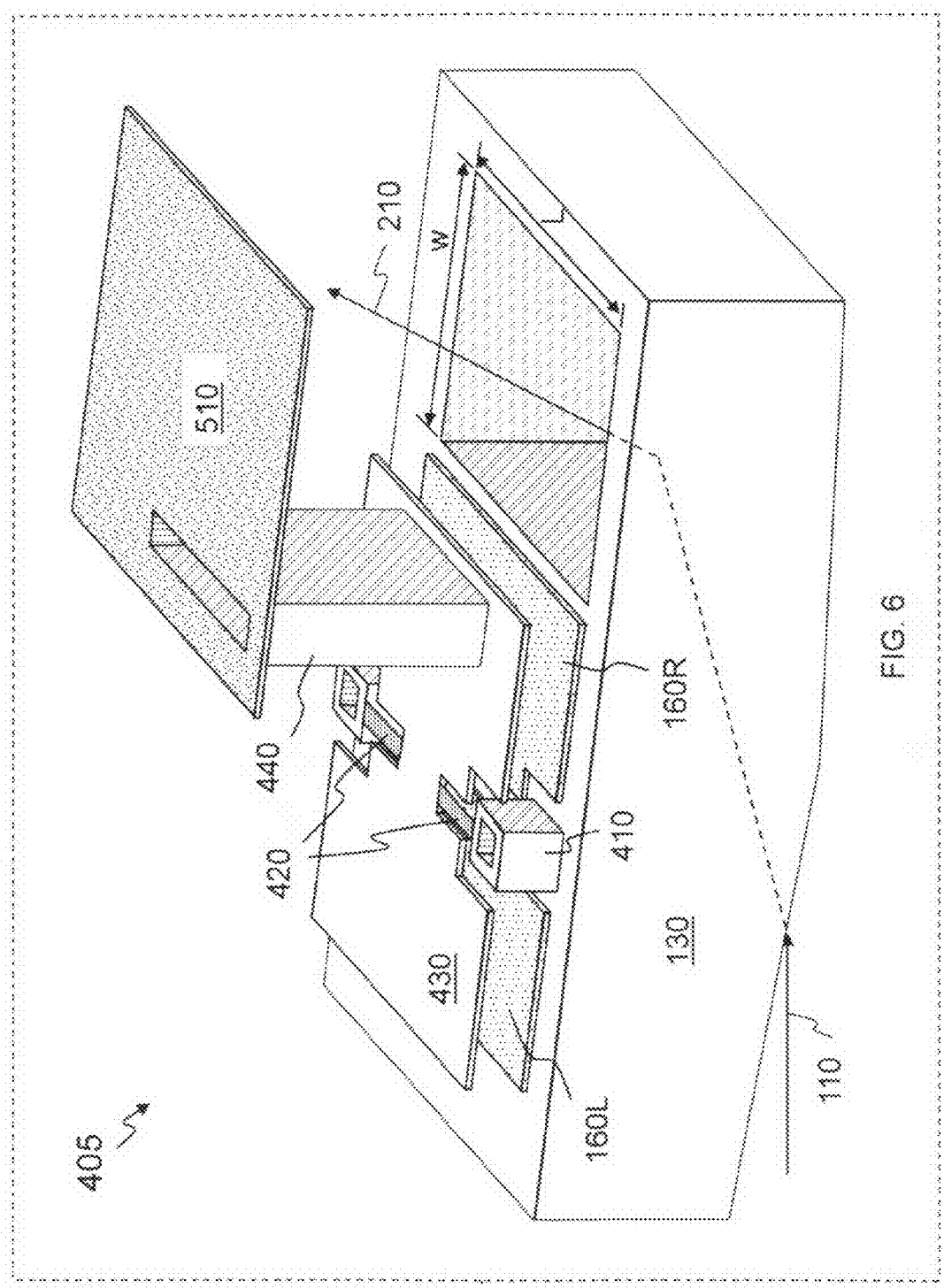
FIG. 6 is a 3-D view of a light shutter on top of a light separator in accordance of the present invention.

FIG. 4 shows light shutters 405 on top of a light separator 300, while FIG. 5 shows more details on the functional principle of the light shutters by showing the path of light when the light shutter is in its ON (FIG. 5A) and OFF (FIG. 5B) positions respectively. Both of these figures are schematics to show the function of light shutters. A corresponding 3-D drawing is shown in FIG. 6 which better illustrates the basic components of the shutters. In both FIGS. 4 and 5, and subsequent related figures, it is assumed that ICs 150 are made on top of light separator, and light shutters 405 are made after and on top of the IC's. (The ICs are not visible in 3-D drawings, FIGS. 6, 7, 8A, and 9). Shutters shown in these figures consist of 6 basic elements (refer to FIG. 6 for details): (1) addressing electrodes 160L and 160R (as mentioned in paragraph [0050], these electrodes can also be considered as part of ICs); (2) bottom supporting posts (or hinge posts) 410 attached to light separator; (3) hinges 420 attached to the top of hinge posts; (4) addressing layers 430 attached to hinges; (5) top supporting posts 440 attached to and atop of addressing layer; and (6) light blocking layers 510 attached to the top supporting posts. The ICs supply electric signal (voltage) to one of the addressing electrodes (160L or 160R) in each shutter, generating electrostatic attraction between the corresponding addressing electrodes and the shutter addressing layers above, The bottom supporting posts provide physical support to other shutter parts above. The shutters are made mechanically flexible to be able to rotate around their hinges under applied electric voltage (addressing voltage) between addressing electrodes and the addressing layers. Thus the hinge in each shutter forms the axis of rotation of the shutter (also referred as shutter rotation axis). Under electrostatic attraction to either side of the addressing electrodes below (160L or 160R), shutter addressing layers 430 rotate around their hinges, with their farthest ends (relative to their respective hinges) land onto the corresponding electrodes. Consequently, the top supporting posts and light blocking layers rotate with the addressing layers. The light blocking layers land onto one of their two positions: either open up a gap above the light separator to allow light to exit to viewer (ON position, the left shutter in FIG. 4 and the one shown in FIG. 5A), or closes the gap and prevent light from exiting to viewer (OFF position, the right shutter in FIG. 4 and the one shown in FIG. 5B). Whichever of the two positions the shutters land onto depends on the applied electric addressing signal to individual shutters.

In order for the shutters to effectively control the path of light (i.e., to be able to either let light passing through to viewer or be blocked off from reaching to viewer), their physical geometries, such as the length and the height of the top blocking layers 510 need to satisfy certain requirements. Those requirements can generally be determined based on a number of factors: the width (w) and depth (D) of light exit grooves (FIG. 4) in light separator; the lateral position of shutters relative to light exit grooves; groove exit surface angle $\beta$ (FIGS. 1A, 1C), the range of light incident angles $\theta$ and the refractive index of the transparent medium of light separator, etc.

However, calculation on those requirements generally does not yield a guide to the best design for optimum performance of the new display device. In what follows, several embodiments of the invention on forming the light shutters with specific characteristics are described. The characteristics are: (1) having small moment of inertia, which is needed for fast shutter response speed; (2) easy to address electrically, i.e., to be able to turn ON and OFF using relatively low voltages; and (3) effective in light switching (blocking off light when turned OFF and passing light through to viewer when turned OFF).

First, it is noted that, shutters with their structure and relative position to light exit grooves schematically shown in FIG. 4 and FIG. 5 (cross section view) and FIG. 6 (3-D view) lack the first characteristics mentioned above, although they may still work adequately in many applications. The top shutter layer 510 extends unnecessarily far from its axis of rotation (hinges 420). Its contribution to the moment of inertia of the entire shutter is thus unnecessarily large. The effect of this is the slowing down of the response speed of the shutters.

One embodiment of the present invention of forming the light shutters with the fore mentioned characteristics is building dual layer asymmetric shutters as shown in FIG. 7A. Shutters shown in FIG. 7A consist of (1) addressing electrodes 160L and 160R; (2) hinge posts 410 (bottom supporting posts) attached to light separator; (3) shutter landing stops 445 under addressing layer and attached to light separator. The function of shutter landing stops will be described in more detail later; (4) hinges 420 attached to the top of hinge posts; (5) addressing layers 430 attached to hinges; (6) top supporting posts 440 attached to and atop of hinges and addressing layers; (7) top shutter layers 510 attached to the top supporting posts. One difference between FIG. 6 and FIG. 7A is that shutter landing stops are added in this new design. Instead of addressing layers making physical contact with addressing electrodes, the addressing layers now contact with the corresponding landing stops. The advantage of having landing stops will be described in a later section. The main difference between FIGS. 6 and 7A is that, the location of the first shutter layer 430 (also referred as the addressing layer, and hence the corresponding bottom electrodes 160L and 160R) with respect to light exit grooves is rotated by 90 degrees from FIG. 6 to FIG. 7A. Assuming light enters into light separator from the left, in FIG. 6 the first shutter layer is situated to the left side of light exit grooves along the direction of groove width (w), while in FIG. 7A the first shutter layer is situated in the front side of the light exit grooves along the direction of groove length (L). The top shutter layer is more close to its rotation axis (hinge 420) in FIG. 7A than that in FIG. 6. Assuming the dimension (size and height) of the top shutter layer 510 is the same in both figures, the total moment of inertia of the shutter is substantially reduced in FIG. 7A compared to FIG. 6, satisfying the first characteristic of the shutter.

The function of the first shutter layer 430 is to provide effective electrostatic interaction with bottom electrodes 160L and 160R. This layer is thus placed sufficiently close to bottom electrodes to increase the interaction, so that the shutter can be addressed (making it to rotate and land onto one of its two landing positions) using relatively low voltages. To further reduce the addressing voltage, part of the bottom electrode is made slightly protruded in a region close to the shutter rotation axis 420 (hinges). This is shown more clearly in FIG. 7B, which shows only the structures below the first shutter layer. Bottom electrodes in the protruded regions 401L and 401R are more close to the first shutter layer, further increases the electrostatic interaction between shutter addressing layer and bottom electrodes and reduces the addressing voltage. This gives satisfaction to the second characteristics of the shutter.

Figure 7B:
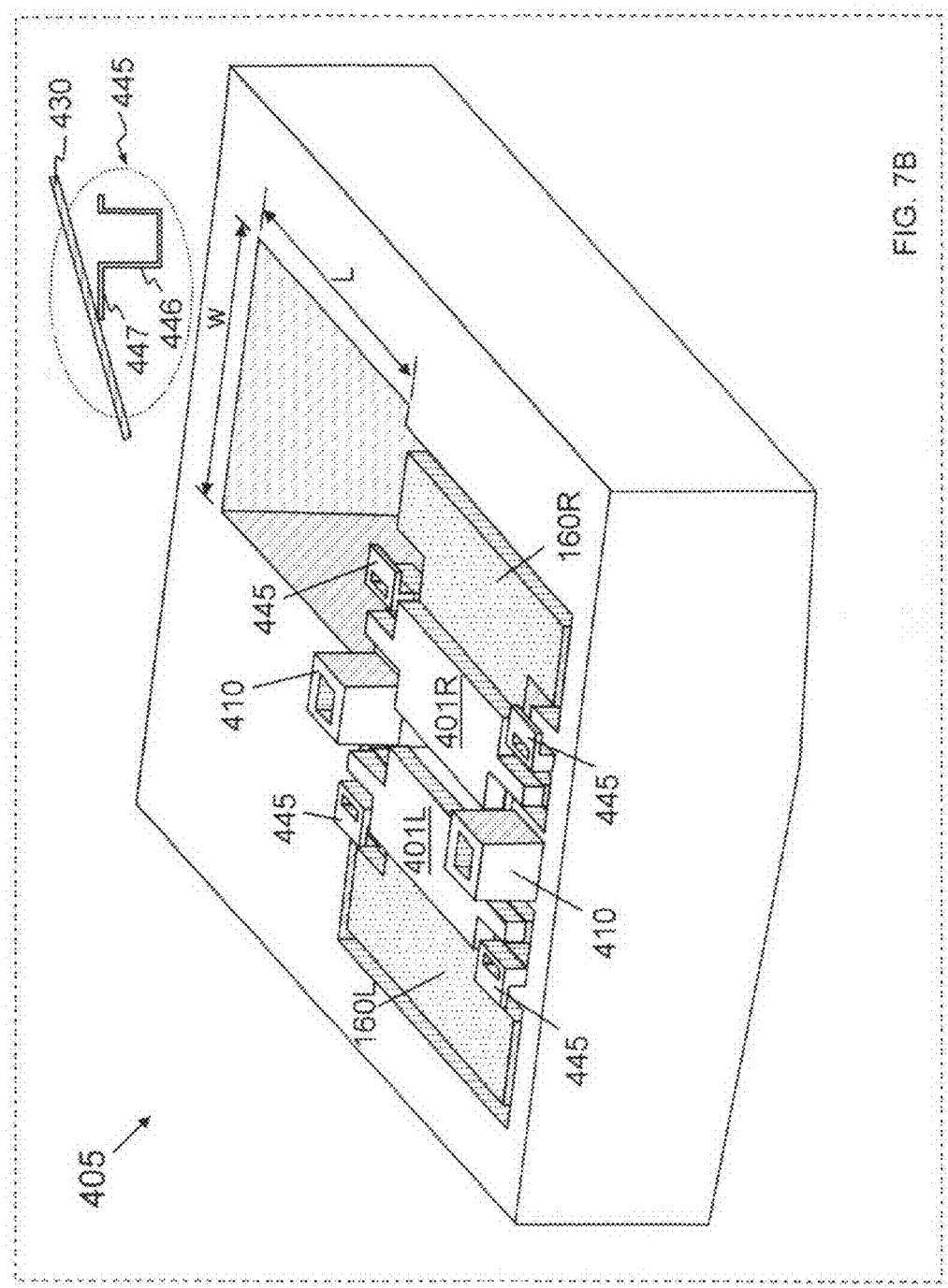
FIG. 7B is a 3-D view of bottom electrodes (160L, 160R, 401L, and 401R), landing stops 445, and hinge posts 410 under the light shutter shown in FIG. 7A, in accordance of the present invention.

Also shown in FIG. 7A and FIG. 7B, shutter landing stops 445 are built under the shutters. These landing stops can be made to a height different from the bottom protruding electrodes 401L and 401R. However, in practice and for manufacturing simplicity, it is more preferred to make these landing stops at the same height as the bottom protruding electrodes 401L and 401R so that both structures can be made using the same manufacturing process steps. These landing stops are farther extended out from the shutter rotation axes (hinges 420) than the bottom protruding electrodes in lateral direction perpendicular to the hinges. This ensures that the shutter addressing layer makes physical contact with the landing stops without touching the bottom protruding electrode. The landing stops are also positioned such that to ensure the outer edge of the first shutter layer 430 will not make contact with any part of the bottom electrode. In other words, the first shutter layer will only make contacts with its landing stops but not anywhere else on bottom electrode. This is useful in several aspects: the landing stops are generally kept at the same electrostatic potential as the first shutter layer, so that there is no electric potential difference at the contact points between first shutter layer and its landing stops. This avoids accumulative residue material build up at the contact points that would otherwise likely occur if the first shutter layer makes contact with any part of the bottom electrodes.

The landing stops can be made relatively thin to have sufficient elasticity for storing some potential energy. In practice, each landing stop can be made of a via 446 (post of landing stop) with an extended thin surface layer 447 as shown in the insert of FIG. 7B. The insert also shows the shutter addressing layer 430 making contact with the landing stop on its extended thin surface layer. When the shutter addressing layer makes contact with the landing stops, the shutter addressing layer presses against the extended surface layer 447 of the landing stops, forces the extended surface layer to deflect downward slightly under pressure. The extended surface layer acts more or less like a spring, stores some potential energy when under deflection. When the shutter is to be released from its landed positions, the extended surface layer relaxes back from its deflected position by releasing the stored energy, kicking off the shutter addressing layer from its landed position. This helps to overcome surface adhesion force between shutter addressing layer and its landing stops when they are in physical contact.

Nearby posts of landing stops (e.g., the two front landing stops 445 in FIGS. 7A and 7B, or nearby landing stops of neighboring pixels or sub-pixels) can be connected together through the surface layer 447 to add some overall rigidity of the posts while maintaining the flexibility of the extending surface layer at individual landing stop. The wall of post 446 of the landing stops can also be made thicker than the extended surface layer 447 for added rigidity.

The top shutter layer 510 is to provide effective light switching function: be able to block off the light coming out of exit grooves in light separator when shutter is in OFF position, and be able to let the light pass through when shutter is in ON position, so that the third characteristics of the shutters is satisfied. The position and dimension of this shutter layer are determined by the dimension of light exiting grooves in light separator.

This top shutter layer is made asymmetric with respect to the addressing layer or with respect to its axis of rotation (hinges). Its lateral dimension only needs to be made slightly larger than the light exit grooves to cover the area above the light exit grooves, but not elsewhere. It does not need to cover the same area that the first shutter layer (addressing layer) covers. This reduces the total mass of the shutter, further reduces the moment of inertia of the entire shutter and increases the shutter response speed.

Figure 8A:
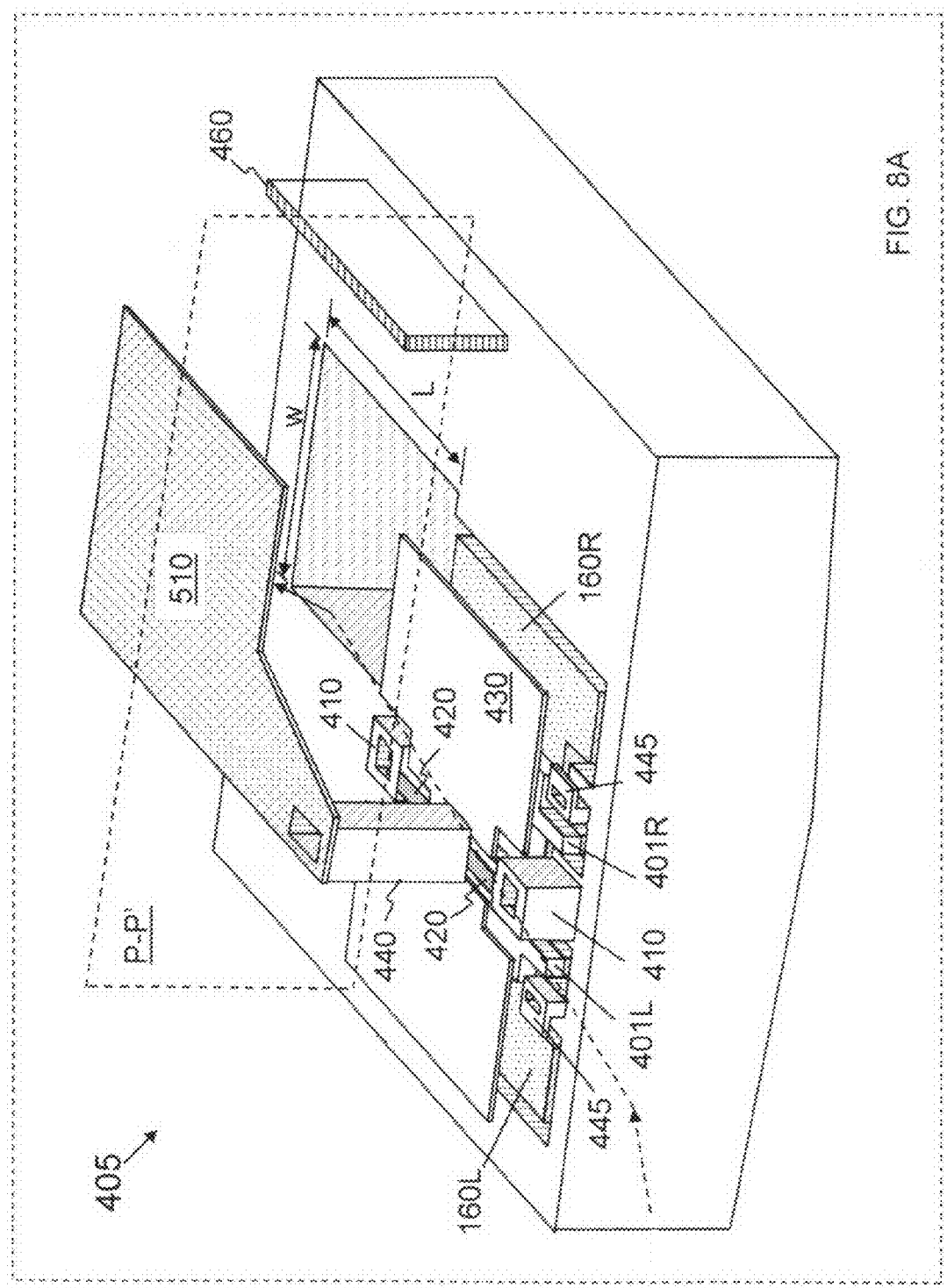
FIG. 8A is a 3-D view of an improved light shutter on top of a light separator, with a view angle adjuster 460 in accordance of the present invention.
Figure 8B:
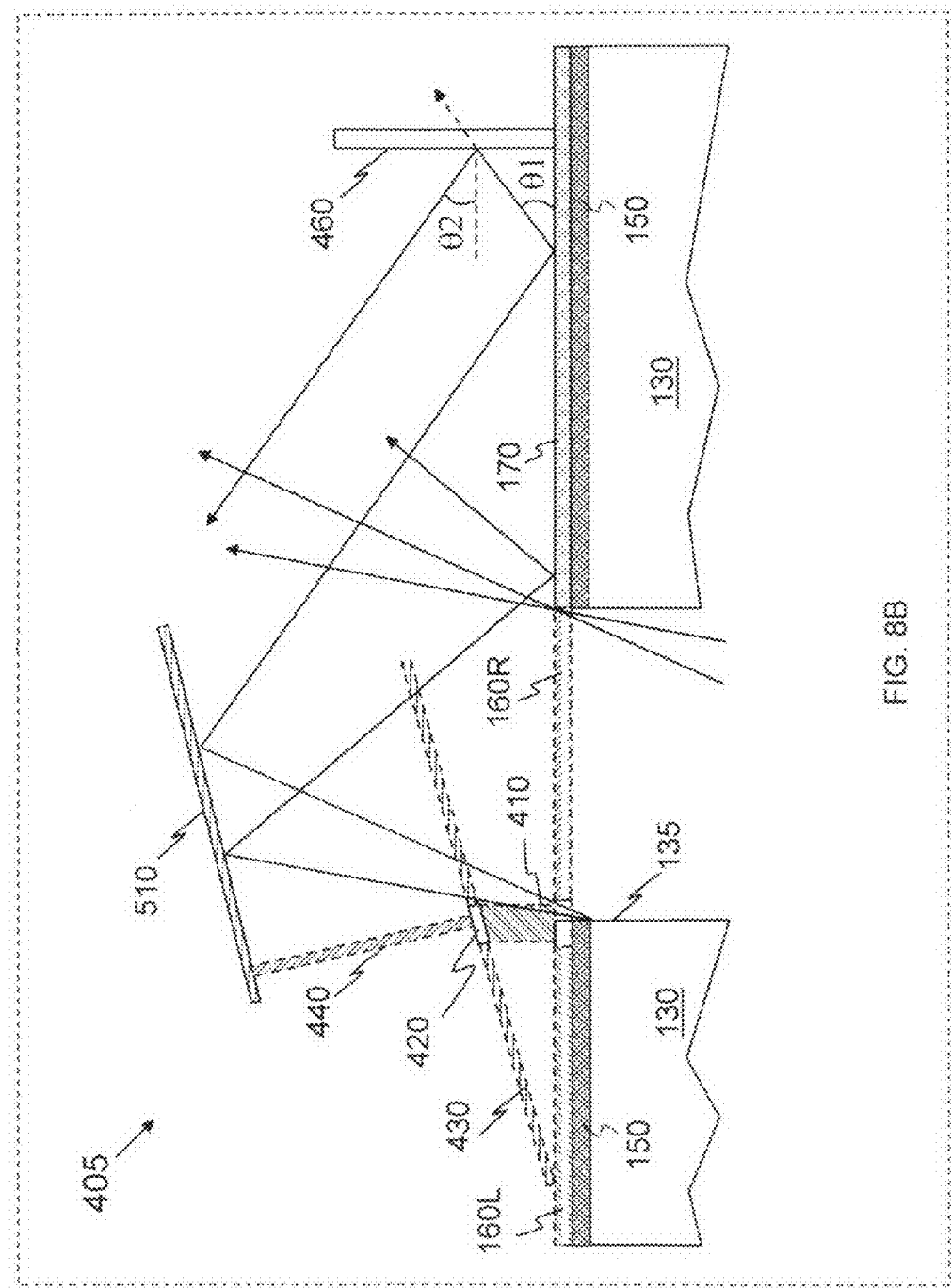
FIG. 8B is a simplified cross-section view of a section of light separator with an improved light shutter in its ON state and a view angle adjuster, in accordance of present invention.
Figure 9:
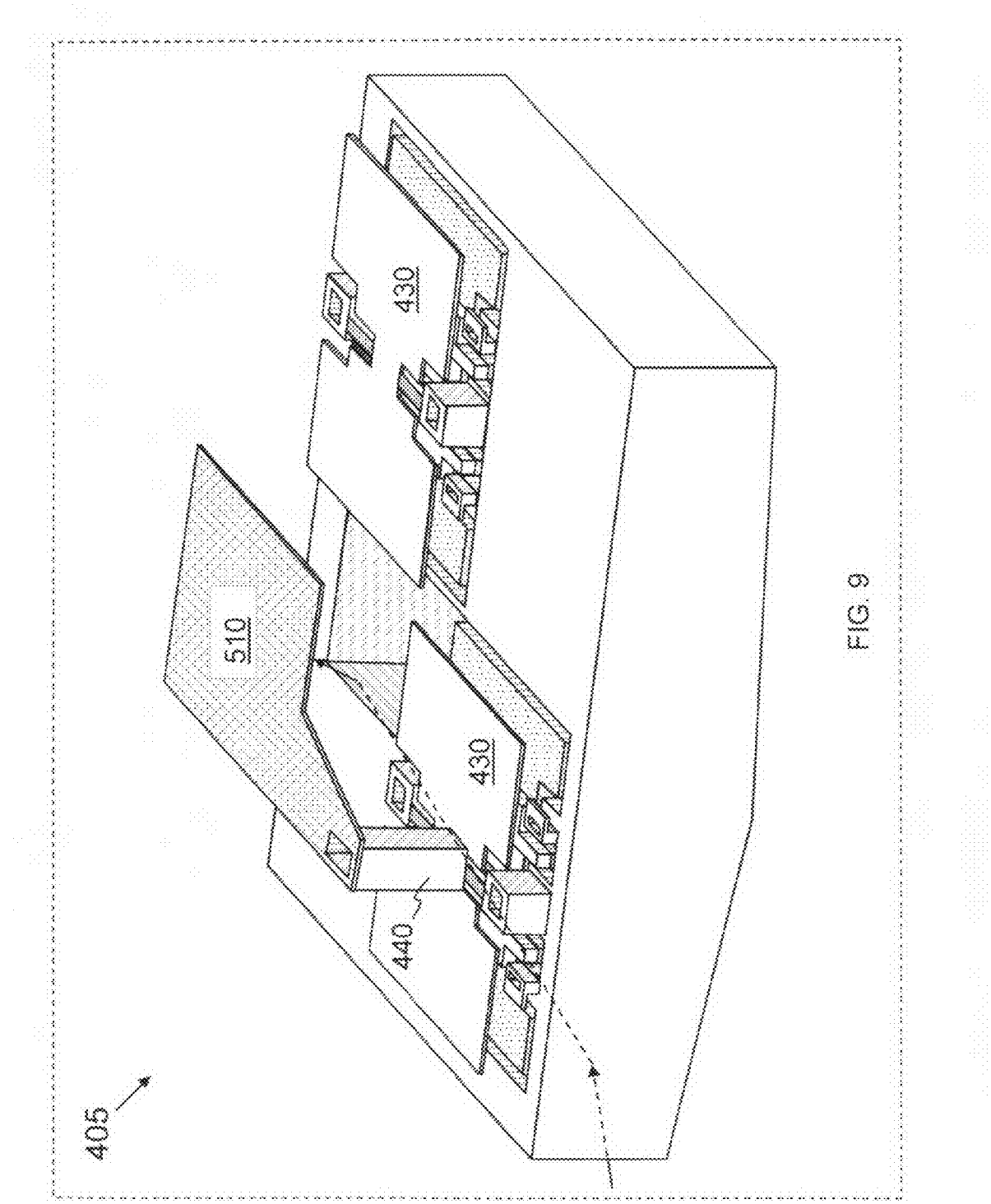
FIG. 9 is a perspective 3-D view of twin shutter in accordance of the present invention.
Figure 10:
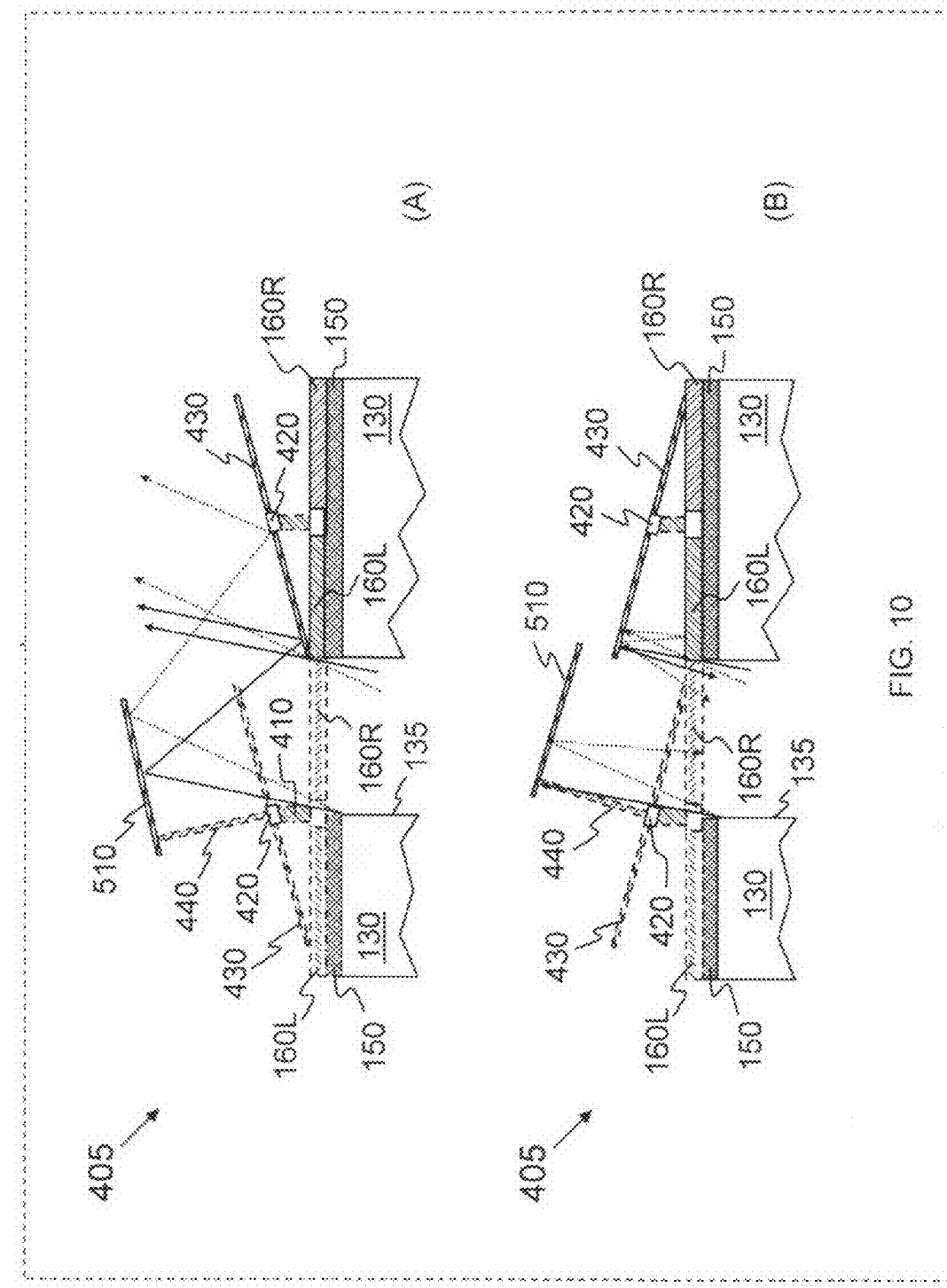
FIG. 10A is a simplified cross-section view of a section of light separator with a twin shutter in its ON state, in accordance of present invention.
FIG. 10B is a simplified cross-section view of a section of light separator with a twin shutter in its OFF state, in accordance of present invention.

Another embodiment of the invention is forming view angle adjusters 460 in the device, on top of light separator. This is shown in FIG. 8A, with a cross-section view shown in FIG. 8B (plan P-P' cut across light exit groove of the light modulator as indicated by the dotted lines in FIG. 8A). Note that the first shutter layer, hinges, hinge posts, and the post for the top shutter layer are out of the plan in this cross section drawing. Thus they are denoted by dotted lines in FIG. 8B to show their position relative to the top shutter layer when viewed from the front. Some light is reflected by the top shutter layer onto surface 170, which is at the level of bottom electrodes but outside of the electrodes. The light is reflected again by this surface to viewer. (For this reason the surface area 170 is preferred to be reflective while everywhere else on the same level is preferred to be highly absorptive.) The net result is that more light is directed to viewer in one particular direction, toward right hand side in FIGS. 8A and 8B in the absence of a view angle adjuster 460. This is not necessarily a bad thing. Indeed, in many circumstances, only the light exiting in one particular direction is useful. For example, when a TV installed on a wall at certain height taller than a typical human, all the light exits from the TV towards upward direction is wasted. In this case, having light preferentially directed toward downward direction is an advantage that most other display devices lack of. However, in other instances, having some light exits in the other direction is generally useful. To achieve this purpose, a light diffusing screen above the shutter can be used to make the exit light more evenly transmitted to different directions. But as shown in FIG. 8B, it is also relatively simple to place a view angle adjuster 460 in each pixel within the device to re-distribute the light in a controlled manner. The view angle adjuster is built on top of and attached to light separator using reflective materials (a light reflector). In a typical manufacturing process, this view angle adjuster can be made using the same steps that hinge posts, hinges, and top layer support posts are made. Now instead of traveling to viewer in direction ($\theta_1$) toward the right side of the pixel, a light beam is reflected by the reflector and reaches to viewer in direction ($\theta_2$) toward the left side of the pixel. Reflector 460 thus acts as a view angle adjuster, or light re-distributor. Its relative position to the light exit groove can be pre-determined for tailored applications. Furthermore, if the light distributor is composed of two elements: one with a thin wall placed on the side closer to light exit groove and another with thicker wall placed on the side farther away from the light exit groove, with both elements relatively close to each other, it is even possible to apply an electric potential difference between the two elements and force the one with thin wall to deflect toward the one with thicker wall, effectively making a view angle adjuster externally controllable.

Still another embodiment of the invention is building twin shutters for light switching. Under certain instances, a single light shutter as shown in FIGS. 7A and 7B may not be sufficient for best performance. This would be the case of large screen displays where pixel size is generally large. In order to be able to completely block off light coming out of exit grooves, top shutter layer needs to be relatively large for single shutter pixels shown in FIG. 7A. However, large top shutter layer will inevitably increase the moment of inertia of the shutter and reduce its response speed. This conflict can be partly resolved using twin shutters shown in FIG. 9, where the shutter on left side is the same as FIG. 7A described previously, but is slightly smaller than would be needed for a single shutter configuration. The shutter on the right side of light exit groove only needs to have one shutter layer—addressing layer 430, and does not need to have the top shutter layer 510 and its support post 440 that the left shutter has. The operation principle of twin shutter is illustrated in FIGS. 10A and 10B for both ON and OFF states respectively. These figures are cross section view cut across a light exit grooves, similar to FIG. 8B for single shutter configuration. For the first shutter on left, its addressing layer, hinges, hinge posts, and the post for the top shutter layer are out of the plan in this cross section view. Thus they are denoted by dotted lines to show their position relative to the top shutter layer when viewed from the front. In the twin shutter device and in ON state, some light is let pass through to viewer from exit grooves without experiencing any reflection by the shutters, and some light is reflected by the top shutter layer of the first shutter (left) onto the addressing layer 430 of the second shutter (right), and reflected again to viewer by this shutter layer. In OFF state, light is completely blocked off by these two shutters. Note that in ON state, light reflected by the top shutter layer no longer reaches to the surface at the electrode level. Thus area originally denoted as 170 in FIGS. 3-5 and 8B no longer needs to be reflective. This area is now replaced by the bottom electrodes (160L and 160R) of the second shutter. In this design, the physical dimension of the top shutter layer of the first shutter (left) can be reduced, reducing its moment of inertia. The shutter on the right side has no top shutter layer. Its moment of inertia is less than that of the left side. The response speed of both shutters is increased compared to using only one larger single shutter.

Still another embodiment of the invention is to make and use redundant sub-pixels for defect suppression. In general, the device reliability and manufacturing process yield are not expected to be an issue, as has already been demonstrated in other MEM devices such a Texas Instruments' DLP. In DLP, pixel size is small (less than 20 microns, in which images are projected onto screens). Small pixel size generally demands higher manufacturing precision with less defect tolerance. Devices created using this invention are likely mostly used for direct view (although projection display using this device can also be made). Thus its pixel sizes are made much larger than that in DLP. For example, a 300 dot per inch (DPI) display resolution requires each pixel to be about 85 um, which is about 5 times the size of DLP mirrors. This is photographic resolution and the resolution of high quality printers for close distance view. In most practical applications, pixel size will be larger than 85 um. This means a typical pixel size of the new device will be at least nearly an order of magnitude larger than that of DLP mirrors. Large pixels generally translate to higher defect tolerance and higher process yield. Nevertheless, some process defects will still generate defective pixels. To minimize the effect of defects, a large pixel can be divided into several smaller sub-pixels. A defect may be confined to within a particular sub-pixel, whose effect is less prominent than an entire pixel composed of several sub-pixels. Furthermore, assuming one particular sub-pixel fails to respond to addressing signal under normal operation condition and always stays ON, one may turn this all time ON sub-pixel into all time OFF sub-pixel by applying a large reset signal to the defective sub-pixel and force that sub-pixel to rotate to its OFF state. After the reset signal is gone, the previous all time ON sub-pixel may become all time OFF sub-pixel and less noticeable by viewers. Remaining good sub-pixels can still operate normally. This makes the defective sub-pixels even less perceivable by viewer. The overall effect is to suppress the effect of defective sub-pixels. This could make the otherwise an unacceptable display device become acceptable, improving the overall process yield and device durability.

Another embodiment of the invention comprises making micro-mechanical light shutters with certain reflectivity on the viewer facing surface (the top surface facing to viewer) of its shutter layer(s) (first and/or second shutter layer), and making the display pixels properly colored to make the device operable using ambient light in reflective mode. Coloring of display pixels can be applied either onto display screens above the light shutters or onto the viewer facing surface of shutter layer(s) directly. Under strong ambient light condition, it is then possible to use the ambient light reflected by shutter layer(s) for display instead of using internal light generated from a light source within the device. This reflective operational mode improves the readability of the display under strong ambient light condition and reduces the power consumption of the device.

For the device to be operated under its normal operational mode—transmission mode using internal light source(s), there are several ways of managing its display color. First, sequential light coloring can be applied, in which case light of different colors is illuminated into the light separator at different period of time, while the light separator needs no coloring element. This is similar to some other display technologies such as DLP that use color wheels and a white light source. For the present invention, it is more convenient to use LEDs, with different color turned on at different time. Light shutters control the relative intensity of each color at each pixel at different period of time.

Alternatively, color filters can be used while using white light source. Each pixel is divided into at least three sub-pixels for controlling three different colors. (Each of these three sub-pixels can also contain several smaller sub-pixels of the same color.) This has already been briefly mentioned in previous sections. For example, color filter is shown in FIGS. 3 and 4 coated on the groove surface. Color filter can also be coated onto either side of a transparent parallel plate placed above the grooves. The final exit angle of light from the grooves, or from the parallel plate, with or without color filter, will be the same.

The color filters can also be placed somewhere else than places mentioned above. For example, light separator can be made of layers of transparent materials (glass, plastics, etc.), with color filter embedded in some of the layers, either in the middle, near the top (close to but below the light exit grooves), or near the bottom of light separator. In more sophistic form, dichroic filters of different colors are placed below the light exit grooves for the corresponding colors, each passes certain color of light while reflects all the other. Light reflected by a dichroic color filter of certain color at a particular pixel can be directed into other pixels having different color and pass through those pixels, thus enhancing the brightness of display without additional input light intensity.

Having the main elements of the device: light separator (with or without color filters), ICs, light shutters, a protective screen is placed on top of the device to protect the shutters. The screen can have light diffusing elements built into it to widen the view angle. The screen must be assembled to the device without damaging the micro-mechanical light shutters. For this purpose another embodiment of the invention is building self-aligned structure for placing micro-spherical ball spacers between light separator and the protective screen. More detail of this embodiment will be described in the section of "Self-aligned structure for placing micro-spherical ball spacers" below.

Figure 11:
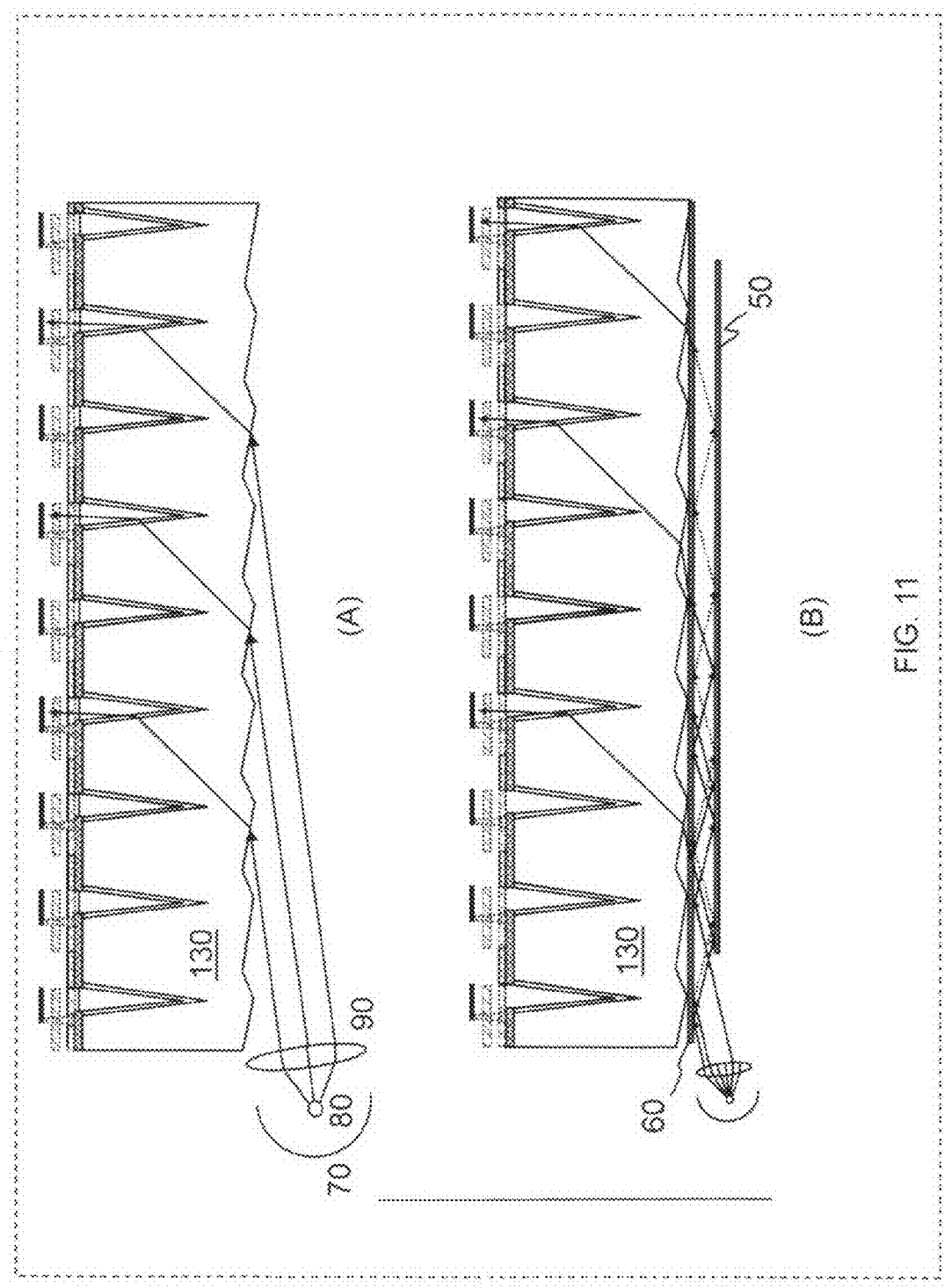
FIG. 11A is a simplified cross-section view of a section of light separator and a parallel light source, with light incident onto light separator at a glazing angle.
FIG. 11B is a simplified cross-section view of a section of light separator and a parallel light source and a light distributor, with light incident onto light separator at a glazing angle.

Finally, light at glazing incident angle is introduced to the light separator from a light source, such as a cold cathode fluorescent lamp (CCFL) or an array of LEDs arranged linearly along one side of the light separator as shown in FIG. 11A. This figure shows a linear light source 80 placed at the focal line of a cylindrical lens 90. Parallel light beam comes out from the lens and is illuminated onto the backside of a light separator. To reduce the depth of the display device, a light distributor can be used. The light distributor has two surfaces: a partially reflective/partially transparent surface 60 (partial reflector with graded reflectance) and totally reflective surface 50 (total reflector), shown in FIG. 11B. Transmission coefficient of the partially reflective/partially transmission surface increases from left (near the light source) to right (farther away from light source), and reflectance decreases from left to right. When light incident onto the partially reflective/partially transmissive surface, some light passes through the surface and goes into medium 130, the remaining light is reflected onto totally reflective surface 50. It is possible to design the partially reflective surface 60 with graded reflectance such that the transmitted light intensity along the light separator is uniform. The total depth of the light distributor (distance between partially reflective/partially transparent surface 60 and totally reflective surface 50) can be made very thin, this translates into very thin depth of the new display device.

Self-Aligned Structure for Placing Micro-Spherical Ball Spacers

In the following several sections, examples of forming self-aligned structure for placing micro-spherical ball spacers between light separator and protective screen are given. The purpose of having such ball-holding structure and using micro-spherical ball spacer is to facilitate the final assembling of protective display screen to light modulator without damaging the light shutters. This structure allows micro-spherical balls to fall and stay within the pre-defined areas, but not anywhere else. This allows external protective screen to make physical contact only with the ball spacers and not the MEM shutters. The manufacturing process cited below is only intended to more clearly explain the concept, the placement and the function of self-aligned ball holding structure and the ball spacers. Actual manufacturing process can be substantially altered from the examples. For example, in sections below, etch process is cited as a mean of removing some deposited material in certain areas defined by photo lithography. In practice, one may also use lift off process instead. With this understanding, the concept of making self-aligned structure and using micro-spherical ball spacers is not limited by the specific examples.

Referring to FIGS. 3 and 4, assuming that light separator 100, TFT ICs (150), bottom electrodes 160L and 160R, and reflective material 170 (for design that uses single dual layer type shutter per pixel) are all fabricated, micro-electro-mechanical (MEM) light shutters 405 are to be manufactured. The MEM light shutter manufacturing uses semiconductor (SC) manufacturing process technologies widely used in the SC industry, and will not be described in detail here.

Figure 12:
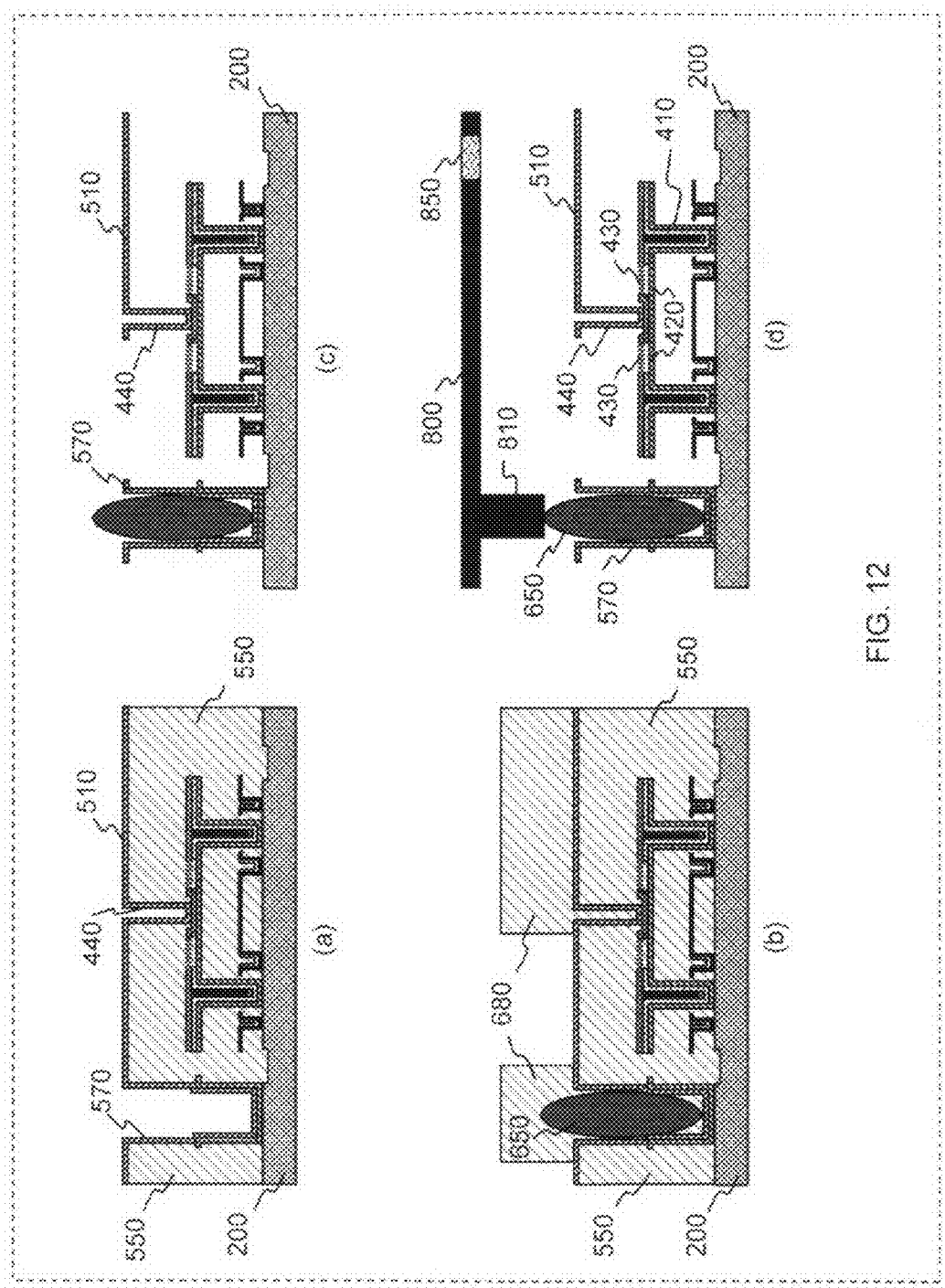
FIG. 12 is a process flow chart showing the concept and some steps of making light shutters with self-aligned micro-spherical ball spacers according to present invention.
Figure 13:
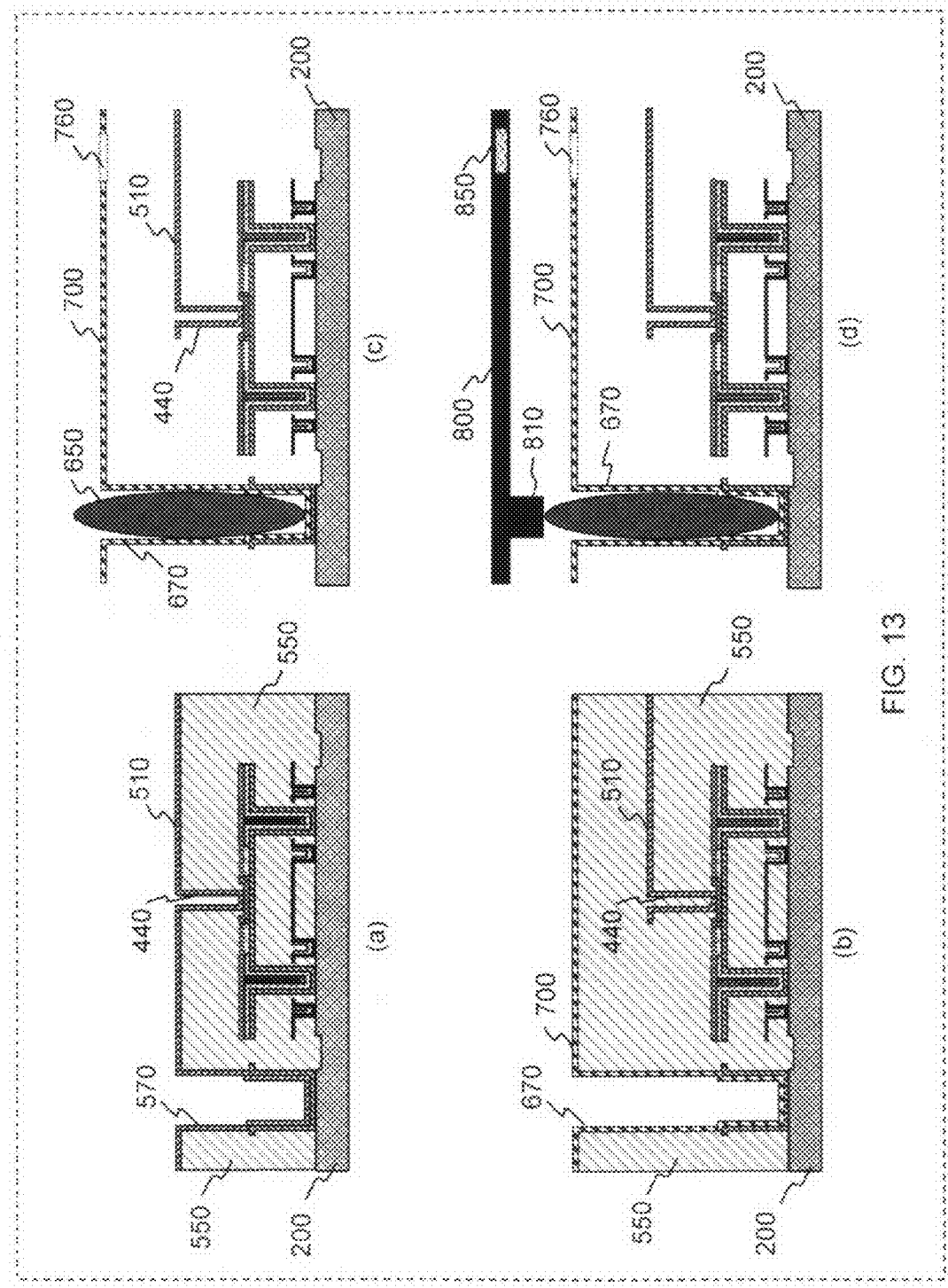
FIG. 13 is another process flow chart showing the concept and some steps of making light shutters with self-aligned micro-spherical ball spacers and an internal protective screen according to present invention.

Referring to FIG. 12a, and starting from the state where the basic MEM shutter structure below its top shutter layer 510 has been completed, photo resist 550 is coated and patterned to form the via for top shutter layer post 440, and to form the via for self-aligned ball-holding structures 570. Note that these structures can but do not need to be aligned in the same plan of a cross sectional view. However, for the purpose of illustrating the manufacturing process steps, these structures are all folded into the same schematic drawing. This is also true for some of the structures below the top shutter layer 510. For example, as labeled in FIG. 12d, hinge 420, addressing layer 430, and hinge post 410 are all folded into the same cross-section view, while in reality the addressing layer 430 is out of the plan (thus the addressing layer is represented by dotted lines). Also for simplicity, light separator is shown by a simple hatched block 200 in FIG. 12a-d without showing its details. The same applies to FIG. 13.

After photo resist 550 is coated and patterned, the top shutter layer 510 is deposited. This also forms the top shutter post 440 and the self-aligned ball-holding structures 570. Micro-spherical balls 650 are placed in the self-aligned ball placement structure 570, FIG. 12b. The device is now coated with another photo resist layer 680 and patterned (FIG. 12b), followed by an etch step to separate the top shutter layer 510 from the self-aligned ball-holding structures 570, FIG. 12c.

Finally, photo-resist is stripped off from the device. This completes the MEMS structure fabrication.

A protective screen 800 with light exit window 850 is now attached to the MEMS structure. The protective screen can have a protruding layer 810 which makes direct contact with the micro-spherical balls. This increases the spatial separation between screen 800 and top shutter layer 510, leaving more space for the top shutter layer to rotate without making direct contact with the screen.

Alternatively, an internal protective screen can be built in the MEMS structure. Starting from FIG. 13a, which is the same as FIG. 12a, a photo resist layer is coated and patterned, followed by an etch step to form individual top shutter layer 510, with post 440. The shutter material deposited into the self-aligned ball-holding structures 570 can be etched away at this step. The device is coated again with photo-resist, which connects to the existing photo-resist 550 (thus still labeled 550) and extends much higher, FIG. 13b. The resist is patterned to form the new via of the self-aligned ball-holding structures 670. Thin film 700 is coated on the device as an internal protective screen. Micro-spherical balls 650 are placed into the self-aligned ball-holding structures 670. Another photo-resist layer is applied, patterned, and an etch step is performed to open a window 760 on the protective screen 700. Photo-resist is then stripped from the device through the window to complete the MEMS structure fabrication. An external protective screen 800 with optical window 850 is attached to the MEMS, with the protruding layer 810 on the screen making direct contact with the micro-spherical balls.

While various embodiments of the present invention have been described above, it should be understood that they have been presented by way of example only, and not limitation. Numerous changes to the disclosed embodiments can be made in accordance with the disclosure herein without departing from the spirit or scope of the invention. As an example, it is within the scope of the invention to have a light separator and/or light shutters with different structure than have been presented. The light shutter may contain more layers than described; the device may include various other elements therein and/or layers thereon. Moreover, instead of using strictly for light display devices, the invention is applicable to other technologies such as for general light switching and MEMS assembly etc. Thus, the breadth and scope of the present invention should not be limited by any of the above described embodiments. Rather, the scope of the invention should be defined in accordance with the following claims and their equivalents.

What is claimed is:

1. A method of fabricating light modulators comprising the steps of:
   (A) forming a light separator to condense uniformly illuminated light into a plurality of pixels, the light separator including,
      a transparent medium with a first surface and a second surface opposite the first surface and a plurality of light exit grooves formed in the medium and on the second surface;
   (B) forming a plurality of integrated electronic driving circuits (ICs) over the light separator; and
   (C) forming a plurality of micro-mechanical light shutters over the light separator.

2. The method of claim 1, in which the transparent medium comprises:
   a flat incident surface on the first surface; and
   a refractive index between 1.4 and 2.7;
   wherein each light exit groove has a groove exit surface angle $\beta$ less than 86 degrees.

3. The method of claim 1, in which the transparent medium comprises:
   a plurality of sloping, substantially saw-tooth shaped incident surfaces on the first surface, wherein each light exit groove has a groove exit surface angle $\beta$ defined by $86° < \beta \leq 90°$, and each of the saw-tooth shaped incident surfaces has a front edge saw-tooth angle ($\alpha$) of at least ($\beta - 86$).

4. The method of claim 1, in which the light separator further comprises a solid transparent parallel plate placed on top of the light exit grooves.

5. The method of claim 1, in which the light separator, when required, has color filters coated on the surfaces of the light separator, and embedded within the light separator.

6. The method of claim 1, in which the integrated circuits (IC) are disposed between the light separator and the micro-mechanical light shutters.

7. The method of claim 1, in which each pixel further comprises a plurality of sub-pixels.

8. The method of claim 1, in which each pixel corresponds to at least one micro-mechanical shutter of a dual-layer type.

9. The method of claim 1, in which each pixel corresponds to at least one micro-mechanical shutter of a dual-layer type and at least one micro-mechanical shutter of a single-layer type.

10. The method of claim 1, in which each of the pixels corresponds to a group of micro-mechanical shutters of a dual layer type, and a group of micro-mechanical shutters of a single-layer type, in which each micro-mechanical shutter corresponds to one of a subset of smaller pixels within each of the pixels.

11. The method of claim 1, in which the step of forming the micro-mechanical light shutters comprises the steps of:
   forming a plurality of conductive addressing electrodes on top of the ICs;
   forming a plurality of shutter landing stops;
   forming a plurality of conductive shutter hinge posts;
   forming a plurality of conductive shutter hinges;
   forming a conductive first layer for each shutter, in which, the conductive first layer has a light facing surface, and a viewer facing surface; wherein
      I) the viewer facing surface is rendered reflective when using ambient light source operating the light separator in reflective mode;
      II) the viewer facing surface is coated with a color filter when operating the light separator in reflective mode using an ambient light source for color display; and
      III) the viewer facing surface coated with at least one anti-reflective coating is rendered absorptive when using an internal light source to operate the light separator in transmission mode;
   forming a plurality of posts for a second shutter layer; and
   forming a second shutter layer atop each first shutter layer, in which,
      the second shutter layer has a light facing surface, and a viewer facing surface; wherein
         I) the viewer facing surface is rendered reflective when using ambient light source operating the light separator in reflective mode;
         II) the viewer facing surface is coated with a color filter when operating the light separator in reflective mode using an ambient light source for color display; and III) the viewer facing surface coated with at least one anti-reflective coating is rendered absorptive when using an internal light source to operate the light separator in transmission mode.

12. The method of claim 1 in which the micro-mechanical light shutters each have
   a top shutter layer positioned to cover each light exit groove in the transparent medium; and
   a center of mass close to its axis of rotation to reduce the moment of inertia of the shutter.

13. The method of claim 1, further comprising the step of:
(D) positioning a protective display screen over the micro-mechanical shutters, in which the protective display screen can be made true black by coating with light absorptive and anti-reflective materials except the area above light exit grooves for improved contrast.

14. The method of claim 1, further comprising the step of:
(D) positioning a protective display screen over the micro-mechanical shutters, in which the protective display screen can be coated with color filters for color display to operate the device in a reflective mode.

15. The method of claim 1, further comprising the steps of:
(D) positioning a protective display screen over the light separator and micro-electro-mechanical light shutters, the light separator having,
   i) a plurality of self-aligned ball-holding structures on top thereof; and
   ii) a plurality of micro-spherical ball spacers individually positioned inside each of the self-aligned ball-holding structures; and
(E) attaching the protective display screen to the light separator through the micro-spherical ball spacers.

* * * * *